(12) United States Patent
Galloway et al.

(10) Patent No.: US 8,869,124 B2
(45) Date of Patent: Oct. 21, 2014

(54) METHOD AND PROGRAM PRODUCT FOR COSTING AND PLANNING THE RE-HOSTING OF COMPUTER-BASED APPLICATIONS

(75) Inventors: Kevin David Galloway, Austin, TX (US); Jonathan Michael Power, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 13/560,234

(22) Filed: Jul. 27, 2012

(65) Prior Publication Data
US 2012/0296853 A1    Nov. 22, 2012

Related U.S. Application Data

(63) Continuation of application No. 10/807,623, filed on Mar. 24, 2004.

(60) Provisional application No. 60/457,155, filed on Mar. 24, 2003.

(51) Int. Cl.
*G06F 9/45* (2006.01)
*G06F 9/44* (2006.01)

(52) U.S. Cl.
CPC ..................................... *G06F 8/76* (2013.01)
USPC .......................................... 717/148; 717/136

(58) Field of Classification Search
CPC .......................................................... G08F 8/76
USPC ................................................. 717/136, 148
See application file for complete search history.

(56) References Cited

U.S. PATENT DOCUMENTS

| | | | |
|---|---|---|---|
| 5,745,880 | A | 4/1998 | Strothmann |
| 6,219,654 | B1 | 4/2001 | Ruffin |
| 6,249,769 | B1 | 6/2001 | Ruffin et al. |
| 6,260,020 | B1 | 7/2001 | Ruffin et al. |
| 6,675,149 | B1 | 1/2004 | Ruffin et al. |
| 6,895,382 | B1 | 5/2005 | Srinivasan et al. |
| 6,968,324 | B1 | 11/2005 | Ruffin et al. |
| 2004/0267581 | A1* | 12/2004 | Krishnamurthy et al. ........ 705/7 |

* cited by examiner

*Primary Examiner* — Phillip H Nguyen
(74) *Attorney, Agent, or Firm* — Christopher & Weisberg, PA; Arthur J. Samadovitz; John Pivnichny

(57) ABSTRACT

A computer-implemented method and program product for estimating cost and/or time requirements for migrating an application from one platform to another. The method includes receiving identifications for tasks, receiving at least one assessment type selected for estimating cost and/or time requirement for migration, where the assessment type delineates a degree of accuracy for estimating the cost and/or time requirement for migration, correlating base costs and/or time requirements to the tasks identified, receiving identifications of attributes that affect base costs and/or time requirements, correlating cost and/or time factors to the tasks, a respective cost factor and/or time factor indicating an amount by which an attribute affects the respective base cost and/or time requirement for a task, and estimating cost and/or time requirements for each task, by applying the respective cost and/or time factors for each task to the respective base cost and/or base time requirements for each task.

18 Claims, 21 Drawing Sheets

ASSESSMENT TEMPLATE

| Task No. | Migration Task | Estimated Cost | Estimated Time Requirement |
|---|---|---|---|
| 1 | System Build | $f(c_1)$ | $f(t_1)$ |
| 2 | Baseline Test | $f(c_2)$ | $f(t_2)$ |
| 3 | Migration | $f(c_3)$ | $f(t_3)$ |
| 4 | System Test | $f(c_4)$ | $f(t_4)$ |
| 5 | Export Data | $f(c_5)$ | $f(t_5)$ |
| 6 | Import Data | $f(c_6)$ | $f(t_6)$ |
| 7 | Deployment | $f(c_7)$ | $f(t_7)$ |
| | TOTALS | | |

FIG. 2

BASE COST MATRIX

| TASK NO. | MIGRATION TASK | AVERAGE BASE COST |
|---|---|---|
| 1 | System Build | $^1\beta$ |
| 2 | Baseline Test | $^2\beta$ |
| 3 | Migration | $^3\beta$ |
| 4 | System Test | $^4\beta$ |
| 5 | Export Data | $^5\beta$ |
| 6 | Import Data | $^6\beta$ |
| 7 | Deployment | $^7\beta$ |

FIG. 4A

| TASK NO. | MIGRATION TASK | COMPLEXITY COST FACTOR MATRIX FOR {SOURCE-TARGET} COMBINATION | | |
|---|---|---|---|---|
| | | GENERIC UNIX to GENERIC UNIX | VMS/OpenVMS to GENERIC UNIX | GENERIC UNIX to UNIX VARIANT |
| 1 | System Build | $^1\lambda_{U\text{-}U}$ | $^1\lambda_{VMS\text{-}U}$ | $^1\lambda_{U\text{-}VAR}$ |
| 2 | Baseline Test | $^2\lambda_{U\text{-}U}$ | $^2\lambda_{VMS\text{-}U}$ | $^2\lambda_{U\text{-}VAR}$ |
| 3 | Migration | $^3\lambda_{U\text{-}U}$ | $^3\lambda_{VMS\text{-}U}$ | $^3\lambda_{U\text{-}VAR}$ |
| 4 | System Test | $^4\lambda_{U\text{-}U}$ | $^4\lambda_{VMS\text{-}U}$ | $^4\lambda_{U\text{-}VAR}$ |
| 5 | Export Data | $^5\lambda_{U\text{-}U}$ | $^5\lambda_{VMS\text{-}U}$ | $^5\lambda_{U\text{-}VAR}$ |
| 6 | Import Data | $^6\lambda_{U\text{-}U}$ | $^6\lambda_{VMS\text{-}U}$ | $^6\lambda_{U\text{-}VAR}$ |
| 7 | Deployment | $^7\lambda_{U\text{-}U}$ | $^7\lambda_{VMS\text{-}U}$ | $^7\lambda_{U\text{-}VAR}$ |

FIG. 4B

HARDWARE COST FACTOR MATRIX FOR {SOURCE-TARGET} MIGRATION

| TASK NO. | MIGRATION TASK | CLUSTERED to DISTRIBUTED | STANDARD CONN. to CUSTOM CONN. | MULTI PROCESSOR to SINGLE PROCESSOR | ... | BIG ENDIAN to LITTLE ENDIAN |
|---|---|---|---|---|---|---|
| 1 | System Build | $^1h_1$ | $^1h_2$ | $^1h_3$ | ... | $^1h_k$ |
| 2 | Baseline Test | $^2h_1$ | $^2h_2$ | $^2h_3$ | ... | $^2h_k$ |
| 3 | Migration | $^3h_1$ | $^3h_2$ | $^3h_3$ | ... | $^3h_k$ |
| 4 | System Test | $^4h_1$ | $^4h_2$ | $^4h_3$ | ... | $^4h_k$ |
| 5 | Export Data | $^5h_1$ | $^5h_2$ | $^5h_3$ | ... | $^5h_k$ |
| 6 | Import Data | $^6h_1$ | $^6h_2$ | $^6h_3$ | ... | $^6h_k$ |
| 7 | Deployment | $^7h_1$ | $^7h_2$ | $^7h_3$ | ... | $^7h_k$ |

FIG. 5

OS COST FACTOR MATRIX
FOR {SOURCE-TARGET} MIGRATION

| TASK NO. | MIGRATION TASK | WINDOWS NT | SUN SOLARIS | OS/400 | VSE/ESA | IBM TPF | CICS | PC DOS | ... | z/OS |
|---|---|---|---|---|---|---|---|---|---|---|
| 1 | System Build | $^1\omega_1$ | $^1\omega_2$ | $^1\omega_3$ | $^1\omega_4$ | $^1\omega_5$ | $^1\omega_6$ | $^1\omega_7$ | ... | $^1\omega_m$ |
| 2 | Baseline Test | $^2\omega_1$ | $^2\omega_2$ | $^2\omega_3$ | $^2\omega_4$ | $^2\omega_5$ | $^2\omega_6$ | $^2\omega_7$ | ... | $^2\omega_m$ |
| 3 | Migration | $^3\omega_1$ | $^3\omega_2$ | $^3\omega_3$ | $^3\omega_4$ | $^3\omega_5$ | $^3\omega_6$ | $^3\omega_7$ | ... | $^3\omega_m$ |
| 4 | System Test | $^4\omega_1$ | $^4\omega_2$ | $^4\omega_3$ | $^4\omega_4$ | $^4\omega_5$ | $^4\omega_6$ | $^4\omega_7$ | ... | $^4\omega_m$ |
| 5 | Export Data | $^5\omega_1$ | $^5\omega_2$ | $^5\omega_3$ | $^5\omega_4$ | $^5\omega_5$ | $^5\omega_6$ | $^5\omega_7$ | ... | $^5\omega_m$ |
| 6 | Import Data | $^6\omega_1$ | $^6\omega_2$ | $^6\omega_3$ | $^6\omega_4$ | $^6\omega_5$ | $^6\omega_6$ | $^6\omega_7$ | ... | $^6\omega_m$ |
| 7 | Deployment | $^7\omega_1$ | $^7\omega_2$ | $^7\omega_3$ | $^7\omega_4$ | $^7\omega_5$ | $^7\omega_6$ | $^7\omega_7$ | ... | $^7\omega_m$ |

FIG. 6

APPLICATION COST FACTOR MATRIX
FOR {SOURCE-TARGET} MIGRATION

| TASK NO. | MIGRATION TASK | REAL-TIME OPERATION | MISSION CRITICAL | OLTP | BATCH PROCESSING | DATA MINING | USER INTERACTIVE | ... | PRODUXN CONTROL |
|---|---|---|---|---|---|---|---|---|---|
| 1 | System Build | $^1a_1$ | $^1a_2$ | $^1a_3$ | $^1a_4$ | $^1a_5$ | $^1a_6$ | ... | $^1a_n$ |
| 2 | Baseline Test | $^2a_1$ | $^2a_2$ | $^2a_3$ | $^2a_4$ | $^2a_5$ | $^2a_6$ | ... | $^2a_n$ |
| 3 | Migration | $^3a_1$ | $^3a_2$ | $^3a_3$ | $^3a_4$ | $^3a_5$ | $^3a_6$ | ... | $^3a_n$ |
| 4 | System Test | $^4a_1$ | $^4a_2$ | $^4a_3$ | $^4a_4$ | $^4a_5$ | $^4a_6$ | ... | $^4a_n$ |
| 5 | Export Data | $^5a_1$ | $^5a_2$ | $^5a_3$ | $^5a_4$ | $^5a_5$ | $^5a_6$ | ... | $^5a_n$ |
| 6 | Import Data | $^6a_1$ | $^6a_2$ | $^6a_3$ | $^6a_4$ | $^6a_5$ | $^6a_6$ | ... | $^6a_n$ |
| 7 | Deployment | $^7a_1$ | $^7a_2$ | $^7a_3$ | $^7a_4$ | $^7a_5$ | $^7a_6$ | ... | $^7a_n$ |

FIG. 7

ENVIRONMENT COST FACTOR MATRIX
FOR {SOURCE-TARGET} MIGRATION

| TASK NO. | MIGRATION TASK | 128-bit SSL SECURITY | HTTP USAGE | COBOL | ... | Custom Language Functions |
|---|---|---|---|---|---|---|
| 1 | System Build | $^1e_1$ | $^1e_2$ | $^1e_3$ | ... | $^1e_p$ |
| 2 | Baseline Test | $^2e_1$ | $^2e_2$ | $^2e_3$ | ... | $^2e_p$ |
| 3 | Migration | $^3e_1$ | $^3e_2$ | $^3e_3$ | ... | $^3e_p$ |
| 4 | System Test | $^4e_1$ | $^4e_2$ | $^4e_3$ | ... | $^4e_p$ |
| 5 | Export Data | $^5e_1$ | $^5e_2$ | $^5e_3$ | ... | $^5e_p$ |
| 6 | Import Data | $^6e_1$ | $^6e_2$ | $^6e_3$ | ... | $^6e_p$ |
| 7 | Deployment | $^7e_1$ | $^7e_2$ | $^7e_3$ | ... | $^7e_p$ |

FIG. 8

BASE TIME REQUIREMENT MATRIX

| TASK NO. | MIGRATION TASK | AVERAGE BASE TIME REQUIREMENT |
|---|---|---|
| 1 | System Build | $^1T$ |
| 2 | Baseline Test | $^2T$ |
| 3 | Migration | $^3T$ |
| 4 | System Test | $^4T$ |
| 5 | Export Data | $^5T$ |
| 6 | Import Data | $^6T$ |
| 7 | Deployment | $^7T$ |

FIG. 9A

COMPLEXITY TIME FACTOR MATRIX

| TASK NO. | MIGRATION TASK | GENERIC UNIX to GENERIC UNIX | VMS/OpenVMS to GENERIC UNIX | ... | GENERIC UNIX to UNIX VARIANT |
|---|---|---|---|---|---|
| 1 | System Build | $^1\psi_{U\text{-}U}$ | $^1\psi_{VMS\text{-}U}$ | ... | $^1\psi_{U\text{-}VAR}$ |
| 2 | Baseline Test | $^2\psi_{U\text{-}U}$ | $^2\psi_{VMS\text{-}U}$ | ... | $^2\psi_{U\text{-}VAR}$ |
| 3 | Migration | $^3\psi_{U\text{-}U}$ | $^3\psi_{VMS\text{-}U}$ | ... | $^3\psi_{U\text{-}VAR}$ |
| 4 | System Test | $^4\psi_{U\text{-}U}$ | $^4\psi_{VMS\text{-}U}$ | ... | $^4\psi_{U\text{-}VAR}$ |
| 5 | Export Data | $^5\psi_{U\text{-}U}$ | $^5\psi_{VMS\text{-}U}$ | ... | $^5\psi_{U\text{-}VAR}$ |
| 6 | Import Data | $^6\psi_{U\text{-}U}$ | $^6\psi_{VMS\text{-}U}$ | ... | $^6\psi_{U\text{-}VAR}$ |
| 7 | Deployment | $^7\psi_{U\text{-}U}$ | $^7\psi_{VMS\text{-}U}$ | ... | $^7\psi_{U\text{-}VAR}$ |

FIG. 9B

HARDWARE TIME FACTOR MATRIX
FOR {SOURCE-TARGET} MIGRATION

| TASK NO. | MIGRATION TASK | CLUSTERED to DISTRIBUTED | STANDARD CONN. to CUSTOM CONN. | MULTI PROCESSOR to SINGLE PROCESSOR | .... | BIG ENDIAN to LITTLE ENDIAN |
|---|---|---|---|---|---|---|
| 1 | System Build | $^1H_{C-D}$ | $^1H_{SC-CC}$ | $^1H_{MP-SP}$ | .... | $^1H_{BE-LE}$ |
| 2 | Baseline Test | $^2H_{C-D}$ | $^2H_{SC-CC}$ | $^2H_{MP-SP}$ | .... | $^2H_{BE-LE}$ |
| 3 | Migration | $^3H_{C-D}$ | $^3H_{SC-CC}$ | $^3H_{MP-SP}$ | .... | $^3H_{BE-LE}$ |
| 4 | System Test | $^4H_{C-D}$ | $^4H_{SC-CC}$ | $^4H_{MP-SP}$ | .... | $^4H_{BE-LE}$ |
| 5 | Export Data | $^5H_{C-D}$ | $^5H_{SC-CC}$ | $^5H_{MP-SP}$ | .... | $^5H_{BE-LE}$ |
| 6 | Import Data | $^6H_{C-D}$ | $^6H_{SC-CC}$ | $^6H_{MP-SP}$ | .... | $^6H_{BE-LE}$ |
| 7 | Deployment | $^7H_{C-D}$ | $^7H_{SC-CC}$ | $^7H_{MP-SP}$ | .... | $^7H_{BE-LE}$ |

FIG. 10

OS TIME FACTOR MATRIX
FOR {SOURCE-TARGET} MIGRATION

| TASK NO. | MIGRATION TASK | WINDOWS NT | SUN SOLARIS | OS/400 | VSE/ESA | IBM TPF | CICS | PC DOS | ... | z/OS |
|---|---|---|---|---|---|---|---|---|---|---|
| 1 | System Build | $^1\theta_1$ | $^1\theta_2$ | $^1\theta_3$ | $^1\theta_4$ | $^1\theta_5$ | $^1\theta_6$ | $^1\theta_7$ | ... | $^1\theta_m$ |
| 2 | Baseline Test | $^2\theta_1$ | $^2\theta_2$ | $^2\theta_3$ | $^2\theta_4$ | $^2\theta_5$ | $^2\theta_6$ | $^2\theta_7$ | ... | $^2\theta_m$ |
| 3 | Migration | $^3\theta_1$ | $^3\theta_2$ | $^3\theta_3$ | $^3\theta_4$ | $^3\theta_5$ | $^3\theta_6$ | $^3\theta_7$ | ... | $^3\theta_m$ |
| 4 | System Test | $^4\theta_1$ | $^4\theta_2$ | $^4\theta_3$ | $^4\theta_4$ | $^4\theta_5$ | $^4\theta_6$ | $^4\theta_7$ | ... | $^4\theta_m$ |
| 5 | Export Data | $^5\theta_1$ | $^5\theta_2$ | $^5\theta_3$ | $^5\theta_4$ | $^5\theta_5$ | $^5\theta_6$ | $^5\theta_7$ | ... | $^5\theta_m$ |
| 6 | Import Data | $^6\theta_1$ | $^6\theta_2$ | $^6\theta_3$ | $^6\theta_4$ | $^6\theta_5$ | $^6\theta_6$ | $^6\theta_7$ | ... | $^6\theta_m$ |
| 7 | Deployment | $^7\theta_1$ | $^7\theta_2$ | $^7\theta_3$ | $^7\theta_4$ | $^7\theta_5$ | $^7\theta_6$ | $^7\theta_7$ | ... | $^7\theta_m$ |

FIG. 11

APPLICATION TIME FACTOR MATRIX
FOR {SOURCE-TARGET} MIGRATION

| TASK NO. | MIGRATION TASK | REAL-TIME OPERATION | MISSION CRITICAL | OLTP | BATCH PROCESSING | DATA MINING | USER INTERACTIVE | ... | PRODUXN CONTROL |
|---|---|---|---|---|---|---|---|---|---|
| 1 | System Build | $^1A_1$ | $^1A_2$ | $^1A_3$ | $^1A_4$ | $^1A_5$ | $^1A_6$ | ... | $^1A_n$ |
| 2 | Baseline Test | $^2A_1$ | $^2A_2$ | $^2A_3$ | $^2A_4$ | $^2A_5$ | $^2A_6$ | ... | $^2A_n$ |
| 3 | Migration | $^3A_1$ | $^3A_2$ | $^3A_3$ | $^3A_4$ | $^3A_5$ | $^3A_6$ | ... | $^3A_n$ |
| 4 | System Test | $^4A_1$ | $^4A_2$ | $^4A_3$ | $^4A_4$ | $^4A_5$ | $^4A_6$ | ... | $^4A_n$ |
| 5 | Export Data | $^5A_1$ | $^5A_2$ | $^5A_3$ | $^5A_4$ | $^5A_5$ | $^5A_6$ | ... | $^5A_n$ |
| 6 | Import Data | $^6A_1$ | $^6A_2$ | $^6A_3$ | $^6A_4$ | $^6A_5$ | $^6A_6$ | ... | $^6A_n$ |
| 7 | Deployment | $^7A_1$ | $^7A_2$ | $^7A_3$ | $^7A_4$ | $^7A_5$ | $^7A_6$ | ... | $^7A_n$ |

FIG. 12

ENVIRONMENT TIME FACTOR MATRIX
FOR {SOURCE-TARGET} MIGRATION

| TASK NO. | MIGRATION TASK | 128-bit SSL SECURITY | HTTP USAGE | COBOL | ... | Custom Language Functions |
|---|---|---|---|---|---|---|
| 1 | System Build | $^1X_1$ | $^1X_2$ | $^1X_3$ | ... | $^1X_p$ |
| 2 | Baseline Test | $^2X_1$ | $^2X_2$ | $^2X_3$ | ... | $^2X_p$ |
| 3 | Migration | $^3X_1$ | $^3X_2$ | $^3X_3$ | ... | $^3X_p$ |
| 4 | System Test | $^4X_1$ | $^4X_2$ | $^4X_3$ | ... | $^4X_p$ |
| 5 | Export Data | $^5X_1$ | $^5X_2$ | $^5X_3$ | ... | $^5X_p$ |
| 6 | Import Data | $^6X_1$ | $^6X_2$ | $^6X_3$ | ... | $^6X_p$ |
| 7 | Deployment | $^7X_1$ | $^7X_2$ | $^7X_3$ | ... | $^7X_p$ |

FIG. 13

CODE COST FACTOR MATRIX
FOR {SOURCE-TARGET} MIGRATION

| TASK NO. | MIGRATION TASK | OS DEP = YES | LOW INTEGRITY > AVERAGE | DATA VOL | ... | Calls to Non-Standard Data Keywords |
|---|---|---|---|---|---|---|
| 1 | System Build | $^1k_1$ | $^1k_2$ | $^1k_3$ | ... | $^1k_q$ |
| 2 | Baseline Test | $^2k_1$ | $^2k_2$ | $^2k_3$ | ... | $^2k_q$ |
| 3 | Migration | $^3k_1$ | $^3k_2$ | $^3k_3$ | ... | $^3k_q$ |
| 4 | System Test | $^4k_1$ | $^4k_2$ | $^4k_3$ | ... | $^4k_q$ |
| 5 | Export Data | $^5k_1$ | $^5k_2$ | $^5k_3$ | ... | $^5k_q$ |
| 6 | Import Data | $^6k_1$ | $^6k_2$ | $^6k_3$ | ... | $^6k_q$ |
| 7 | Deployment | $^7k_1$ | $^7k_2$ | $^7k_3$ | ... | $^7k_q$ |

FIG. 15

**CODE TIME FACTOR MATRIX
FOR {SOURCE-TARGET} MIGRATION**

| TASK NO. | MIGRATION TASK | OS DEP = YES | LOW INTEGRITY > AVERAGE | DATA VOL AVERAGE | | Calls to Non-Standard Data Keywords |
|---|---|---|---|---|---|---|
| 1 | System Build | $^1m_1$ | $^1m_2$ | $^1m_3$ | ... | $^1m_q$ |
| 2 | Baseline Test | $^2m_1$ | $^2m_2$ | $^2m_3$ | ... | $^2m_q$ |
| 3 | Migration | $^3m_1$ | $^3m_2$ | $^3m_3$ | ... | $^3m_q$ |
| 4 | System Test | $^4m_1$ | $^4m_2$ | $^4m_3$ | ... | $^4m_q$ |
| 5 | Export Data | $^5m_1$ | $^5m_2$ | $^5m_3$ | ... | $^5m_q$ |
| 6 | Import Data | $^6m_1$ | $^6m_2$ | $^6m_3$ | ... | $^6m_q$ |
| 7 | Deployment | $^7m_1$ | $^7m_2$ | $^7m_3$ | ... | $^7m_q$ |

FIG. 17

| TASK NO. | MIGRATION TASK | CREATE TESTS | APPLICATION RE-BUILD | OFF-SITE TESTING | PROGRESSIVE UNIT TESTS | NON-STANDARD CRITERIA | CUSTOM H/W SIMULATION |
|---|---|---|---|---|---|---|---|
| | | TESTING COST FACTOR MATRIX FOR {SOURCE-TARGET} MIGRATION | | | | | |
| 2 | Baseline Test | $^2\eta_1$ | $^2\eta_2$ | $^2\eta_3$ | $^2\eta_4$ | $^2\eta_5$ | $^2\eta_r$ |
| 4 | System Test | $^4\eta_1$ | $^4\eta_2$ | $^4\eta_3$ | $^4\eta_4$ | $^4\eta_5$ | $^4\eta_r$ |

FIG. 18

TESTING TIME FACTOR MATRIX
FOR {SOURCE-TARGET} MIGRATION

| TASK NO. | MIGRATION TASK | CREATE TESTS | APPLICATION RE-BUILD | OFF-SITE TESTING | PROGRESSIVE UNIT TESTS | NON-STANDARD CRITERIA | CUSTOM H/W SIMULATION |
|---|---|---|---|---|---|---|---|
| 2 | Baseline Test | $^2b_1$ | $^2b_2$ | $^2b_3$ | $^2b_4$ | $^2b_5$ | ... $^2b_r$ |
| 4 | System Test | $^4b_1$ | $^4b_2$ | $^4\eta_3$ | $^4b_4$ | $^4b_5$ | ... $^4b_r$ |

FIG. 19

METHOD AND PROGRAM PRODUCT FOR COSTING AND PLANNING THE RE-HOSTING OF COMPUTER-BASED APPLICATIONS

REFERENCE TO RELATED APPLICATIONS

This application is a continuation of patent application Ser. No. 10/807,623, filed Mar. 24, 2004, entitled METHOD AND PROGRAM PRODUCT FOR COSTING AND PLANNING THE RE-HOSTING OF COMPUTER-BASED APPLICATIONS, which claims priority to U.S. Provisional Patent Application No. 60/457,155 filed Mar. 24, 2003, entitled METHOD FOR COSTING AND PLANNING THE RE-HOSTING OF COMPUTER-BASED APPLICATIONS, the contents of each of which are hereby incorporated herein by reference.

BACKGROUND OF THE INVENTION

1. Technical Field of the Invention

The invention relates generally to the field of methods for re-hosting computer-based applications. More specifically, the invention relates to a method and program product for costing and planning the re-hosting, or migration, of computer-based applications from source computer-based platforms to target computer-based platforms.

2. Description of Related Art

The use of computer systems and applications greatly simplifies the storage and processing of data. Nevertheless, the large volume of data that a business processes in a short time period can cause the business to become entrenched in its use of a particular platform or computer-based environment. By the time a significant advance is made, the business may be so mired within an antiquated system that it is forced to lose money each year due to the inefficiencies of the system. In response to this problem, methods and systems for migrating applications among computer-based platforms have been developed.

Re-hosting applications from a source platform to a target platform can be expensive, but a time typically arrives when the cost of continuing inefficiencies outweighs the cost of migration. A business must be able to determine when it reaches this condition, in order to obtain the most benefit from its time and monetary expenditures on a migration. Nevertheless, while methods for migration have grown, businesses have been unable to estimate the cost for migration of applications within useful tolerances. Hence, businesses are prone to waste their resources by significantly undershooting or overshooting the point when migration becomes a cost-effective solution.

In addition to the cost of a migration project, a business also needs to allow for downtime and other lapses in its application and computer system operations. Again, current migration methods overlook this logistical question and only focus on the end result. A business undergoing migration can suffer needlessly, then, due to an inability to plan precisely for the length of interruption in its operations. This adds to the true cost of migration, forcing some businesses to undergo migration of applications either sooner, or later, than it becomes cost-effective.

As a result, there exists a great need in the art for a method of estimating the cost of application migration, on a per application basis, within specified tolerances. Additionally, there is a great need in the art for a method of estimating the time required for application migration, on a per application basis, within specified tolerances. The method must provide a thorough analysis of factors that affect the cost and time required for the migration of individual applications, in order to overcome the inconsistencies and inaccuracies of ad hoc plans and cost estimates.

SUMMARY OF THE INVENTION

The current invention is directed to a method of estimating the cost of application migration, on a per application basis. The invention is also directed toward a method for estimating the time required for application migration, on a per application basis. The method provides allows varying degrees of thoroughness in its analysis of migration attributes that affect the cost and time required for the migration of individual applications between platforms. In this way, the invention produces consistent and reliable results with a degree of accuracy that is genuinely valuable to the particular user.

The current invention provides a computer-implemented method for estimating the cost and/or time requirements for migrating a computer-based application from a source platform to a target platform. The invented method comprises the steps of receiving identifications of said migration tasks; correlating base costs to respective ones of said migration tasks; receiving identifications of migration attributes; correlating cost factors to respective ones of said migration tasks, each cost factor indicating an amount by which a migration attribute changes the base cost of a migration task; and estimating a cost for each migration task, by applying all cost factors for the migration task to the base cost of the migration task.

The migration attributes that may be considered in estimating cost may comprise one or more attributes, such as hardware attributes, operating system attributes, application attributes, environment attributes, source code attributes, complexity attributes and testing attributes, as further described herein. One or more of the base costs and cost factors may be received from a user.

The invented method may also comprise applying tolerances to one or more of the estimated costs and total cost, such that one or more of these is returned as a cost range. At least one assessment type may be chosen or defined by a user, such that the assessment observes the user's desired degree of accuracy for the total cost and the cost of each migration task.

The invented method may comprise, in addition or in the alternative to cost estimation, steps for estimating time requirements for a migration. The steps required for estimating time may comprise correlating base time requirements to respective ones of said migration tasks; correlating time factors to respective ones of said migration tasks, each time factor indicating an amount by which a migration attribute changes the base time requirement for a migration task; and estimating a time requirement for each identified migration task, by applying all time factors assigned to the migration task to the base time requirement of the migration task.

The migration attributes that may be considered in estimating time requirements may comprise one or more attributes, such as hardware attributes, operating system attributes, application attributes, environment attributes, source code attributes, complexity attributes and testing attributes, as further described herein. One or more of the base time requirements and time factors may be received from a user.

The invented method may also comprise applying tolerances to one or more of the estimated time requirements and total time requirement, such that one or more of these is returned as a time range. At least one assessment type may be chosen or defined by a user, such that the assessment observes the user's desired degree of accuracy for the total time requirement and the time requirement for each migration task.

Where both time and cost for each migration task and/or for a total migration are estimated, they may be output on a common assessment.

Individual aspects or functions of the invented method may be embodied in computer-readable program products. Hence the current invention is also directed to computer-readable program code means for implementing and executing the steps of the methods disclosed, in a manner that will be readily known to those skilled in the art.

BRIEF DESCRIPTION OF THE DRAWINGS

FIG. 2 is an illustration of an example embodiment of an assessment template.

FIG. 4A is an illustration of an example embodiment of a base cost matrix.

FIG. 4B is an illustration of an example embodiment of a complexity cost factor matrix.

FIG. 5 is an illustration of an example embodiment of a hardware cost factor matrix.

FIG. 6 is an illustration of an example embodiment of an OS cost factor matrix.

FIG. 7 is an illustration of an example embodiment of an application cost factor matrix.

FIG. 8 is an illustration of an example embodiment of an environment cost factor matrix.

FIG. 9A is an illustration of an example embodiment of a base time requirement matrix.

FIG. 9B is an illustration of an example embodiment of a complexity time factor matrix.

FIG. 10 is an illustration of an example embodiment of a hardware time factor matrix.

FIG. 11 is an illustration of an example embodiment of an OS time factor matrix.

FIG. 12 is an illustration of an example embodiment of an application time factor matrix.

FIG. 13 is an illustration of an example embodiment of an environment time factor matrix.

FIG. 15 is an illustration of an example embodiment of a code cost factor matrix.

FIG. 17 is an illustration of an example embodiment of a code time factor matrix.

FIG. 18 is an illustration of an example embodiment of a testing cost factor matrix.

FIG. 19 is an illustration of an example embodiment of a testing time factor matrix.

DETAILED DESCRIPTION OF THE INVENTION

Figure 1:
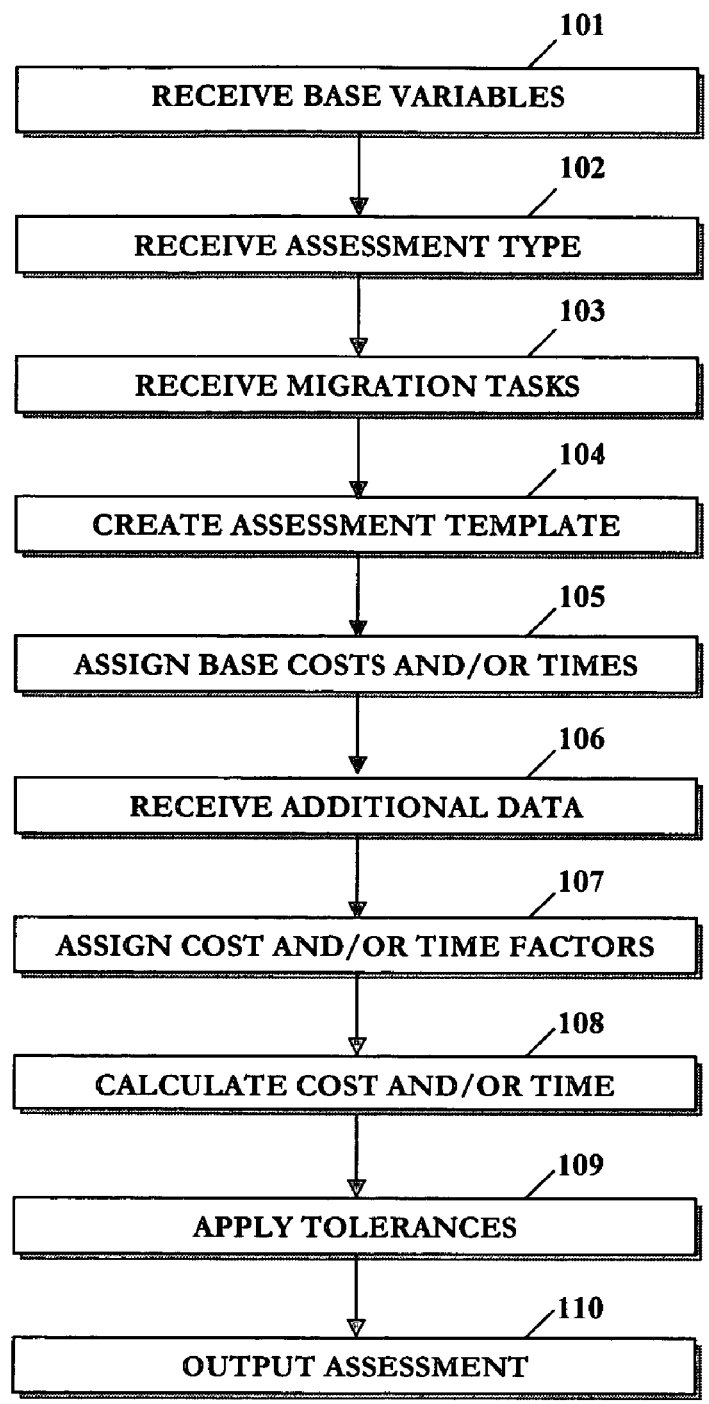
FIG. 1 is a flow diagram illustrating the invented method, wherein a cost and/or time estimate for the migration of an application from a source platform to a target platform is output.

Referring now to the drawings, the invention is directed to a method for costing and planning the migration of an application among computer-based environments. The individual steps of the method are preferably executed by at least one computer software program embodied on a computer-readable medium, without regard to the operating system of the computer or the language of the software programs. It will be appreciated by those skilled in the art that some steps of the method may be performed in series, and some in parallel or in series. Additionally, the order of the steps may in some instances be changed, without departing from the scope or advantages of the current invention. The order in the following embodiments is given only for ease of explanation.

FIG. 1 is a flow diagram illustrating a method for costing and planning the migration of an application from a source computer-based environment to a target computer-based environment, in accordance with the current invention. In accordance with step 101, a set of base variables is received. The base variables comprise an application to be migrated, a source platform on which the application currently operates, and a target platform for the application.

In accordance with step 102, an assessment type is received. The assessment types are referred to herein as Type C, Type B, and Type A assessments. An assessment may comprise a cost estimate, a time estimate, or both cost and time estimates, for migrating the application from the source platform to the target platform. Assessment types may be delineated by the type or amount of information processed, in order to calculate the cost and/or time estimate returned by the assessment. Assessment types may also be delineated by the degree of accuracy in cost and/or time that the assessment is intended to entail. For purposes of this description, assessments are delineated by their intended accuracy, and, hence, by the type and amount of information gathered.

In accordance with step 103, an identifier for at least one migration task is received. The migration tasks may be user-defined, or they may be chosen from a list of pre-defined migration tasks. Alternatively, a set of migration tasks may be associated with each assessment type, such that they are received automatically upon receipt of an assessment type. The individual migration tasks involved in migrating a specified application from a particular source platform to a particular target platform are readily known to those skilled in the art. Such migration tasks may comprise, for example, system building, project management, ramp up, baseline testing, migration of the application from the source platform to the target platform, system testing after migration, delivery of the migrated application, acceptance testing to validate that the application can process data, project completion and sign-off, exporting data from the source platform and importing the data to the application on the target platform, redirecting user terminals to the target platform, replacing third party products that cannot be ported to the target platform, and any other individual migration tasks that may be involved in the migration of a computer-based application from a source platform to a target platform.

In accordance with step 104, at least one assessment template may be created. An assessment template contains the names of the individual migration tasks that will be involved in the migration, cross-referenced to the costs of such migration tasks. The migration tasks may also be cross-referenced to time requirements for each migration task, such as duration of each task in work hours or days, and start and finish times. The migration tasks may be cross-referenced to any other information suitable for the planning and costing of individual migration project tasks. In one embodiment, the assessment template comprises a form, such as that shown by FIG. 2. Those skilled in the art will appreciate that this embodiment of the template is illustrative, and that other templates, including relational and associative forms may be used without departing from the scope of the invented method.

The assessment template may be created upon receiving a plurality of migration tasks. Alternatively, an assessment template may be chosen from a plurality of pre-defined templates, each containing a different subset of migration tasks.

The cost of each migration task in the assessment template is shown in a column separate from that of the migration tasks, such that each cost is represented in the same row of the template as the migration task to which it corresponds. For purposes of this description, the cost of each migration task 'i' will be represented by the function $f(c_i)$. The variable 'i' may actually be represented as a priority number or any other suitable number for sequentially identifying the migration tasks represented in the assessment template, such that the total cost of the migration process can be achieved by summing the costs of migration tasks, 1 . . . i.

The template may also include a breakdown of costs, such as labor and materials, with or without reference to specific tasks.

At least one time requirement for each migration task in the assessment template may be shown in a column separate from those of the migration tasks and costs, such that a time requirement is represented in the same row of the assessment template as the migration task to which it corresponds. For purposes of this description, the time requirement for each individual task will be represented by the function $f(t_i)$. The variable 'i' may actually be represented as a priority number or any other suitable number for sequentially identifying the migration tasks represented in the assessment template, such that the total time for the migration process can be achieved by summing the time requirements for migration tasks, 1 . . . i. Where both time and cost are estimated on the template, the variable 'i' shall be identical for both $f(t_i)$ and $f(c_i)$.

In accordance with step 105, a base cost is assigned to each migration task. Where time is being estimated, a base time is assigned to each migration task. The base cost comprises the average base cost for the migration task, when migrating the application received in step 101 between the source and target platforms received in step 101. The base time comprises the average base time requirement for the migration task, when migrating the application received in step 101 between the source and target platforms received in step 101. Base costs and base times may be user-defined; may be chosen from a database; or may be automatically assigned from a database upon receipt of the base variables. Base costs and base times may vary depending upon the type of assessment to be returned.

In accordance with step 106, attributes relevant to the migration are received. Migration attributes may include hardware attributes, operating system attributes, application attributes, environment attributes, source code attributes, testing attributes, or any combination of these. The various migration attributes are described in further detail below.

For each migration attribute received, a cost factor is assigned to each identified migration task, in accordance with step 107. Each cost factor represents the amount by which the attribute changes the base cost of a migration task. Where time is being estimated, a time factor is assigned to each migration task. Each time factor represents the amount by which the attribute changes the base time of each migration task. Cost and time factors may comprise proportions that are greater than, less than, or equal to, one. Cost and time factors may be input by users; they may be chosen from a database of cost and time factors; or they may be automatically called from a database in the forms of cost and time factor matrices relevant to the attributes and base variables, as further described below.

In accordance with step 108, the cost factors assigned to each migration task are applied to the base cost for the migration task, as further described herein. This results in an estimated cost for each migration task. Time factors assigned to each migration task are applied to the base times for the migration task, as further described herein. In accordance with step 109, tolerances may be applied to the cost and/or time for individual migration tasks. The cost and/or time for the migration tasks are then summed to achieve a total cost and/or time requirement for the migration. Finally, in accordance with step 110, an assessment of the type received in step 102 is output, containing the estimated cost and/or time requirement for the migration. The assessment may conform to the assessment template created in step 104, if any. The estimates for cost and time may comprise fixed numbers or ranges. The assessment may also contain cost and/or time estimates for individual migration tasks, which estimates may be fixed numbers, ranges, or a combination of fixed numbers and ranges.

The steps of the invented method are described in further detail below, with specific references to the different types of assessments and the assignment of base costs and times, and cost and time factors.

Figure 3:
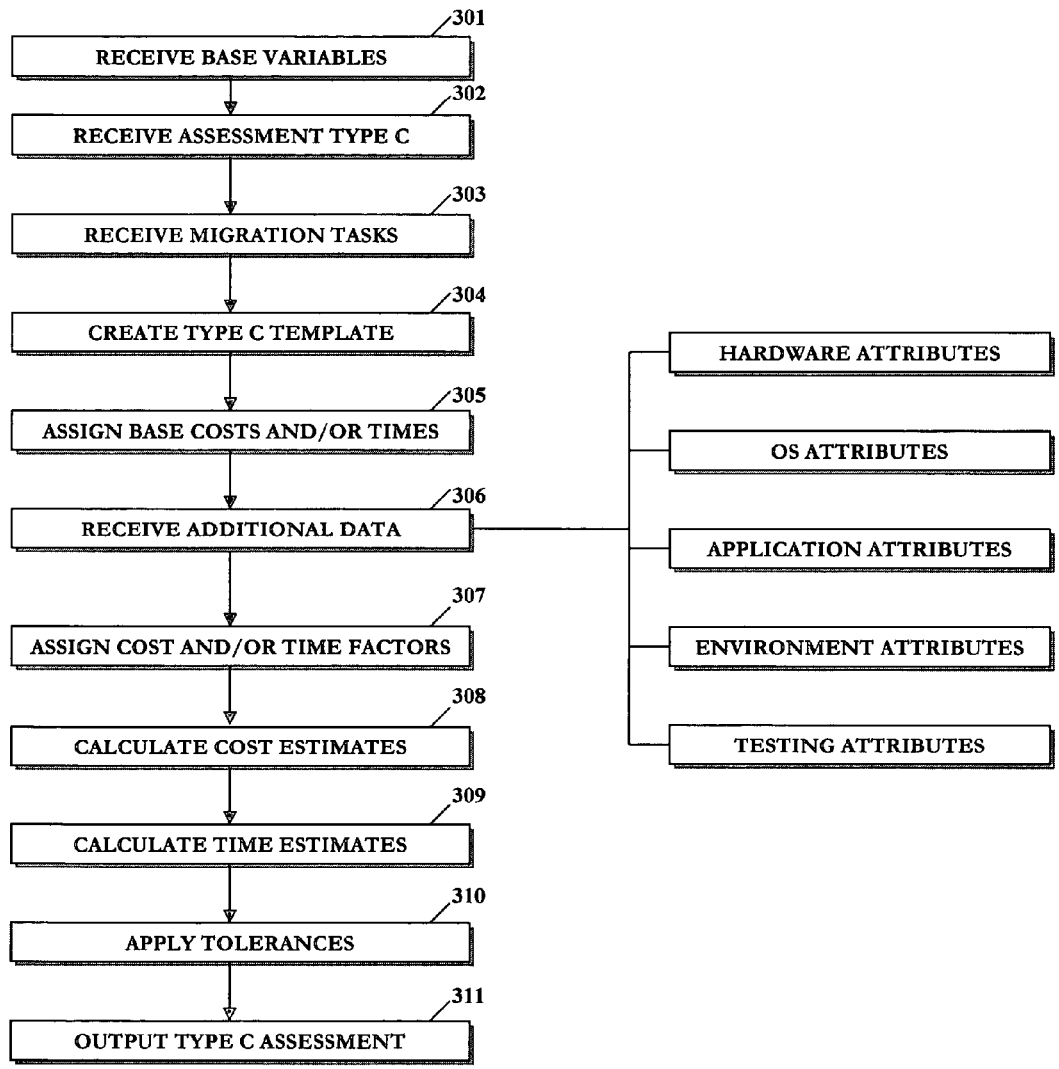
FIG. 3 is a flow diagram further illustrating steps of the invented method, wherein a Type C assessment is output, in accordance with the current invention.

FIG. 3 is a flow diagram illustrating a method for returning a Type C assessment for the migration of an application from a source platform to a target platform, in accordance with the current invention. In accordance with step 301, base variables are received, which comprise an application to be migrated, a source platform on which the application currently operates, and a target platform on which the application is to be re-hosted.

The application variable may comprise a specific application name and version. Alternatively, the application may include the function of the application and (if more than one function) its component parts, such as production control, batch processing, data mining, online transaction processing (OLTP), or other functions. In the preferred embodiment of the invention, the application variable comprises the name, version and function(s) of the application and its component parts.

The source and target platform variables may comprise any platforms suitable for operating the computer-based application to be migrated. These platforms may include, for example, UNIX (generic or variants), OpenVMS, IBM AS/400 or iSeries, HP 300 MPE, IBM Mainframe, and other platforms that are readily known to those skilled in the art.

In accordance with step 302, a user's choice of a Type C assessment is received. In accordance with step 303, an identifier for at least one migration task is received, as described with reference to FIG. 1. In accordance with step 304, an assessment template may be created in the manner described with reference to FIG. 1. The assessment template for a Type C assessment preferably comprises a high-level representation of migration tasks, as distinguished from a Type B or Type A assessment template. A Type C template may also comprise just a total figure for cost and/or time.

In accordance with step 305, base costs and/or times are assigned to each migration task. For a Type C assessment, the base variables are preferably compared with at least one base cost matrix in a database. Each base cost matrix sets forth an average base cost for migration tasks, such as those listed previously. A base cost matrix may conform substantially to that shown in FIG. 4A, wherein migration tasks are listed in one column, and a base cost is shown in the row containing a migration task to which the base cost corresponds. A base cost, $^i\beta$, is extracted from the database, for each migration task, T, received in step 303. Note that each base cost matrix may contain base cost data for more migration tasks than are received in step 303.

Each base cost matrix may set forth average costs for migration tasks, with respect to specific applications. Alternatively, each base cost matrix may set forth average base costs for migration tasks, with respect to the degree of commonality of various applications. For example, base cost matrices may be built for standard applications (for example, word processors and data storage), non-standard (such as compilers and communication software), and custom-made applications. Matrices may be built to reflect additional qualitative categories of applications that have a quantifiably distinguishable effect on the cost of at least one migration task.

Where time requirements are being estimated, base time requirements are assigned to each migration task. For a Type C assessment, the base variables are preferably compared with at least one base time matrix in a database. Each base cost matrix sets forth an average base cost for migration tasks, such as those listed previously. A base time requirement matrix may conform substantially to that shown in FIG. 9A, wherein migration tasks are listed in one column, and a base time requirement is shown in the row containing a migration task to which the base time requirement corresponds. A base time, $^iT$, is extracted from the database, for each migration task, 'i', received in step 303. Note that each base cost matrix may contain base time data for more migration tasks than are received in step 303.

Each base time requirement matrix may set forth average time requirements for migration tasks, with respect to specific applications. Alternatively, each base time matrix may set forth average base time requirements for migration tasks, with respect to the degree of commonality of various applications. For example, base time matrices may be built for standard applications (for example, word processors and data storage), non-standard (such as compilers and communication software), and custom-made applications. Matrices may be built to reflect additional qualitative categories of applications that have a quantifiably distinguishable effect on the time requirement for at least one migration task.

In accordance with step 306, at least one migration attribute is received. The migration attributes may comprise, for example, hardware attributes, current operating system attributes, attributes of the application to be migrated, environment attributes, or testing attributes. Hardware attributes include elements of source and target platform hardware architecture, which affect the complexity of migrating an application or porting data between the source and target platforms. Examples of hardware attributes may include, for example, clustering, disks, external interfaces, archive media, memory, networking, media, processors, terminal types (e.g., dumb, emulated), workstations, third-party hardware elements, byte storage sequence (e.g., big endian, little endian) and other aspects of hardware architecture that impact the process of migrating an application or porting data a source platform and a target platform.

Operating system attributes may comprise the type and version of the source platform's current operating system(s).

The application attributes comprise attributes of the application that may affect the cost and plan for migrating the application, other than the overall function(s) of the application. Application attributes may comprise, for example, whether the application is real-time; mission critical; user interactive; used for production control, batch processing, data mining, on-line transaction processing (OLTP), or other relevant attributes that may affect the cost and plan for migrating the application. Application attributes may be expressed in descriptive form, or as yes-no (or other analogous binary system) indicators for pre-defined attributes.

Environment attributes may comprise any attributes of the software environment, in which the application is operated on the source platform, that may affect the cost or plan for migrating the application. Environment attributes may comprise, for example, development languages; databases and other data storage and access attributes; user interfaces; communication transport protocols; networking attributes; shell script usage; security attributes; batch processing characteristics; and other attributes of the software environment in which the application is operated on the source platform, that may affect the cost or plan for migrating the application.

Testing can be used as a measurement of progress during migration, and it can limit debugging time afterward. Testing itself, however, can have a significant impact upon the time and cost for a migration. Testing during a migration may comprise baseline testing, i.e., testing the application on the source platform before it is migrated. Testing may also comprise system testing, i.e., testing the application after migration. A set of criteria may be established for verifying proper performance of the application. Both the baseline testing results and the system testing results are compared with the criteria, such that proper performance of the application can be verified both before and after the migration of the application between platforms.

Testing attributes may comprise any inventory and criteria that might impact upon the length of time or cost for baseline or system testing. Such information may include, for example, the need to create testing programs; whether baseline or system testing requires visits to other sites; the need to setup the application or the testing programs prior to baseline testing; any need to rebuild the application in a clean environment prior to testing; the testing process itself; verifying test results and comparing them to criteria; and debugging of the application after migration. Testing attributes may also comprise the types of testing to be performed, such as unit tests (subroutine level) and whether unit testing will be performed as the application is ported to the new platform; functional tests (tests of user functions) testing of batch processes; integration tests (program level tests of the application's external interfaces); regression tests (movement of data between user functions); performance tests; system management tests (start-up, shutdown, etc.); and hardware tests.

In accordance with step 307, cost and/or time factors corresponding to each migration attribute received in step 306, and corresponding to the base variables, are assigned to each migration task. For a Type C assessment, the assignment of cost factors is preferably achieved by a user choosing attributes from pre-defined lists. The attributes are then compared with at least one cost factor matrix in a database. Each cost factor matrix contains cost factors for various migration tasks, when at least one attribute is relevant to migrating a specified application from a specified source platform to a specified target platform. Each cost factor matrix may set forth factors for migration tasks, with respect to specific applications. Alternatively, each cost factor matrix may set forth cost factors for migration tasks, with respect to the degree of commonality of various applications. For example, cost factor matrices may be built for standard applications (for example, word processors and data storage), non-standard (such as compilers and communication software), and custom-made applications. Matrices may be built to reflect additional qualitative categories of applications that have a quantifiably distinguishable effect on the cost of at least one migration task. Various cost factor matrices are described in further detail, below.

One example of a cost factor matrix contemplated for returning a Type C assessment is a complexity cost factor matrix. Each complexity cost factor matrix sets forth factors, comprising the amounts by which the costs of various migration tasks are changed by the complexity of migrating an application between a source platform and a target platform. A complexity cost factor matrix may conform substantially to that shown in FIG. 4B, wherein a complexity cost factor, $^i\lambda_{S-T}$, is shown at the intersection of each row containing a migration task, 'i', and a column containing a source-target combination, 'S-T'. Note that a complexity cost factor matrix may contain complexity cost factors for more migration tasks than are received in step 303.

The factors may comprise proportions by which the base costs of migration tasks may be multiplied to reflect the effect of the source-target combination in increasing, decreasing or not affecting, the average base cost of migration tasks during a migration process. The effect of various source-target combinations upon the base cost of each migration task, and hence the development of each complexity cost factor, $^i\lambda_{S-T}$, will be readily appreciated by those skilled in the art.

A single universal complexity cost factor matrix may be used, or many complexity cost factor matrices may be used, each one containing factors for only one type of source-target combination, such as UNIX-UNIX; Generic UNIX-UNIX Variant; AIXv(x)-AIXv(x+1); Windows XP-Solaris/Intel; and the like. Species of source and target platforms may be particularized (such as Bull GCOS, DG DG-UX, FreeBSD, HP HP-UX, HP MPE, HP NSK, HP OpenVMS/Alpha, HP OpenVMSNAX, HP Tru64 UNIX, HP VMSNAX, IBM AIX, IBM DOSNSE, IBM DYNIX/ptx, IBM MVS, IBM OS/390, IBM zOS, Intel Linux, SCO UnixWare, SGI Irix, Solaris/Intel, Solaris/SPARC, Windows 9x, Windows NT/200, Windows XP and the like). Species of source and target platforms may be non-particularized (such as common platform, uncommon platform, custom platform, proprietary platform, and the like). Particularized and non-particularized species may be combined on a single complexity cost factor matrix and in individual source-target combinations (such as WinXP-proprietary platform).

Once at least one complexity cost factor matrix is identified that reflects the source-target combination received in step 301, a complexity cost factor, $^i\lambda_{S-T}$, for each migration task, 'i', in the assessment template is obtained from the complexity cost factor matrix or matrices. Note that $^i\lambda_{S-T}$ may differ for each migration task.

Another type of cost factor matrix that may be used in returning a Type C assessment is a hardware cost factor matrix. Each hardware cost factor matrix sets forth factors, comprising the amounts by which the costs of various migration tasks are changed due to the presence of at least one hardware attribute during migration. A hardware cost factor matrix may conform substantially to that shown in FIG. 5, wherein a hardware cost factor, $^ih_k$, is shown at the intersection of each row containing a migration task, 'i', and a column containing a hardware attribute combination, 'k'. Note that a hardware cost factor matrix may contain hardware cost factors for more migration tasks than are received in step 303.

The factors may comprise proportions by which the base costs of migration tasks may be multiplied to reflect the effect of at least one hardware attribute in increasing, decreasing or not affecting, the average base costs of the migration tasks during a migration process. The effect of various hardware attribute combinations upon the base cost of each migration task, and hence the development of each hardware cost factor, $^ih_k$, will be readily appreciated by those skilled in the art.

A single universal hardware cost factor matrix may be used, or many hardware cost factor matrices may be used, each one containing factors for only one type of hardware attribute combination, such as external interface combinations, media combinations, byte storage sequencing combinations, and the like. Species of hardware attributes may be particularized (such as big endian to little endian, and the like). Species of hardware attributes may be non-particularized (such as, standard connectivity to non-standard connectivity, common processors to custom processors, and the like). Particularized and non-particularized species may be combined on a single hardware cost factor matrix.

Once at least one hardware cost factor matrix is identified containing the hardware attribute combinations, 1 . . . k, which were received in accordance with step 306, the hardware cost factors, $^ih_1 \ldots {}^ih_k$, for each migration task in the assessment template are obtained from the hardware cost factor matrix or matrices. Note that $^ih_1 \ldots {}^ih_k$ may differ for each migration task.

Another type of cost factor matrix that may be used in returning a Type C assessment is an operating system (OS) cost factor matrix. Each OS cost factor matrix sets forth factors, comprising the amounts by which the costs of various migration tasks are changed due to the operating system operated on the source platform (due to, for example, threads, embedded SQL/RDBMS access, kernel mode routines, clustering functionality, operating system intrinsics, library functions, etc.). An OS cost factor matrix may conform substantially to that shown in FIG. 6, wherein an OS cost factor, $^i\omega_m$, is shown at the intersection of each row containing a migration task, 'i', and a column containing an operating system, 'm'. Note that an OS cost factor matrix may contain OS cost factors for more migration tasks than are received in step 303.

The factors may comprise proportions by which the base costs of migration tasks may be multiplied to reflect the effect of the OS operated on the source platform in increasing, decreasing or not affecting, the average base costs of the migration tasks during a migration process. The effect of various operating systems upon the base cost of each migration task, and hence the development of each OS cost factor, $^i\omega_m$, will be readily appreciated by those skilled in the art.

A single universal OS cost factor matrix may be used, or many OS cost factor matrices may be used, each one containing factors for only one type of operating system. Species of operating systems may be particularized (such as Microsoft Windows® NT, Sun Solaris® and the like). Species of operating systems may be non-particularized (such as, standard, non-standard, custom, and the like). Particularized and non-particularized species may be combined on a single OS cost factor matrix.

Once at least one OS cost factor matrix is identified containing the operating systems, 1 . . . m, which were received in accordance with step 306, the OS cost factors, $^i\omega_1 \ldots {}^i\omega_m$, for each migration task in the assessment template are obtained from the OS cost factor matrix or matrices. Note that $^i\omega_1 \ldots {}^i\omega_m$, may differ for each migration task.

Another type of cost factor matrix that may be used in returning a Type C assessment is an application cost factor matrix. Each application cost factor matrix sets forth factors, comprising the amounts by which the costs of various migration tasks are changed due to at least one attribute of the application being migrated. An application cost factor matrix may conform substantially to that shown in FIG. 7, wherein an application cost factor, $^i\alpha_n$, is shown at the intersection of each row containing a migration task, 'i', and a column containing an application attribute, 'n'. Note that an application cost factor matrix may contain application cost factors for more migration tasks than are received in step 303.

The factors may comprise proportions by which the base costs of migration tasks may be multiplied to reflect the effect of application attributes in increasing, decreasing, or not affecting, the average base costs of the migration tasks during a migration process. The effect of each application attribute upon the base cost of each migration task, and hence the development of each application cost factor, $^i\alpha_n$, will be readily appreciated by those skilled in the art.

A single universal application cost factor matrix may be used, or many application cost factor matrices may be used, each one for a single application attribute, such as real-time operation, OLTP, and the like. Species of applications may be non-particularized (such as, standard, non-standard, custom, and the like). Particularized and non-particularized species may be combined on a single application cost factor matrix.

Once at least one application cost factor matrix is identified containing the application attributes, 1 . . . n, which were received in accordance with step 306, the application cost factors, $^i\alpha_1 \ldots {}^i\alpha_n$, for each migration task in the assessment template are obtained from the application cost factor matrix or matrices. Note that $^i\alpha_1 \ldots {}^i\alpha_n$ may differ for each migration task.

Another type of cost factor matrix that may be used in returning a Type C assessment is an environment cost factor matrix. Each environment cost factor matrix sets forth factors, comprising the amounts by which the costs of various migration tasks are changed due to at least one environment attribute. An environment cost factor matrix may conform substantially to that shown in FIG. 8, wherein an environment cost factor, $^i\epsilon_p$, is shown at the intersection of each row containing a migration task, 'i', and a column containing an environment attribute, 'p'. Note that an environment cost factor matrix may contain environment cost factors for more migration tasks than are received in step 303.

The factors may comprise proportions by which the base costs of migration tasks may be multiplied to reflect the effect of environment attributes in increasing, decreasing, or not affecting, the average base costs of the migration tasks during a migration process. The effect of each environment attribute upon the base cost of each migration task, and hence the development of each environment cost factor, $^i\epsilon_p$, will be readily appreciated by those skilled in the art.

A single universal environment cost factor matrix may be used, or many environment cost factor matrices may be used, each one containing factors for only one type of environment attribute, such as external interface, media, and the like. Species of environment attributes may be particularized (such as 128-bit SSL security, hypertext transfer protocol usage, COBOL language and the like). Species of environment attributes may be non-particularized (such as, standard languages, non-standard security, custom communication transfer protocols, and the like). Particularized and non-particularized species may be combined on a single environment cost factor matrix.

Once at least one environment cost factor matrix is identified containing the environment attributes, 1 . . . p, which were received in accordance with step 306, the environment cost factors, $^i\epsilon_1 \ldots {}^i\epsilon_p$, for each migration task in the assessment template are obtained from the environment cost factor matrix or matrices. Note that $^i\epsilon_1 \ldots {}^i\epsilon_p$, may differ for each migration task.

Another type of cost factor matrix that may be used in returning a Type C assessment is a testing cost factor matrix. Each testing cost factor matrix sets forth factors, comprising the amounts by which the costs of various migration tasks are changed due to at least one testing attribute. A testing cost factor matrix may conform substantially to that shown in FIG. 18, wherein a testing cost factor, $^i\eta_r$, is shown at the intersection of each row containing a migration task, 'i', and a column containing an environment attribute, 'r'. Note that the effects of testing attributes may only affect, for example, the baseline testing and system testing costs. This example is shown in FIG. 18, where i=2 or 4, because these are the task numbers given to baseline and system testing in the example assessment template shown in FIG. 2.

The factors may comprise proportions by which the base cost of baseline test and/or system test may be multiplied to reflect the effect of the testing attribute in increasing, decreasing, or not affecting, the average base cost of the baseline testing and/or system testing during a migration process. The effect of each testing attribute upon the base cost of baseline testing and system testing, and hence the development of each environment cost factor, $^i\eta_r$, will be readily appreciated by those skilled in the art.

A single universal testing cost factor matrix may be used, or many environment cost factor matrices may be used, each one containing factors for only one type of testing attribute, such as re-building the application, use of unit testing, creation of testing programs, testing sites, testing criteria and the like. Species of testing attributes may be particularized (such as no re-building, progressive unit testing, perform baseline test off-site and the like). Species of testing attributes may be non-particularized (such as, standard testing suites, non-standard performance criteria, custom hardware simulation during testing, and the like). Particularized and non-particularized species may be combined on a single testing cost factor matrix.

Once at least one testing cost factor matrix is identified containing the testing attributes, 1 . . . r, which were received in accordance with step 306, the testing cost factors, $^i\eta_1 \ldots {}^i\eta_r$, for baseline and system testing are obtained from the testing cost factor matrix or matrices. Note that $^i\eta_1 \ldots {}^i\eta_r$, may differ for each type of testing.

In accordance with step 308, the cost for the migration is estimated. The calculation of estimated cost is achieved by applying the cost factors assigned in step 307 to the base costs assigned in step 305. The cost $f(c_i)$ for each individual migration task received in step 303, other than baseline test and system test, is estimated as follows:

$$f(c_i) = {}^i\beta^i \lambda_{S-T}({}^ih_1 {}^ih_2 \ldots {}^ih_n)({}^i\omega_1 {}^i\omega_2 \ldots {}^i\omega_m)({}^i\alpha_1 {}^i\alpha_2 \ldots {}^i\alpha_n)({}^i\epsilon_1 {}^i\epsilon_2 \ldots {}^i\epsilon_p)$$

The cost $f(c_2)$ for baseline test is estimated as follows:

$$f(c_2) = {}^2\beta^2 \lambda_{S-T}({}^2h_1 {}^2h_2 \ldots {}^2h_n)({}^2\omega_1 {}^2\omega_2 \ldots {}^2\omega_m)({}^2\alpha_1 {}^2\alpha_2 \ldots {}^2\alpha_n)({}^2\epsilon_1 {}^2\epsilon_2 \ldots {}^2\epsilon_p)({}^2\eta_1 {}^2\eta_2 \ldots {}^2\eta_r).$$

The cost $f(c_2)$ for system test is estimated as follows:

$$f(c_4) = {}^4\beta^4 \lambda_{S-T}({}^4h_1 {}^4h_2 \ldots {}^4h_n)({}^4\omega_1 {}^4\omega_2 \ldots {}^4\omega_m)({}^4\alpha_1 {}^4\alpha_2 \ldots {}^4\alpha_n)({}^4\epsilon_1 {}^4\epsilon_2 \ldots {}^4\epsilon_p)({}^4\eta_1 {}^4\eta_2 \ldots {}^4\eta_r).$$

The cost estimate for the migration process shown on the assessment template is then estimated as follows:

$$\sum_{i=1}^{i} f(c_i)$$

Where time requirements are estimated, step 307 includes assignment of time factors to each migration task. For a Type C assessment, the assignment of time factors is preferably achieved by a user choosing attributes from pre-defined lists.

The attributes are then compared with at least one time factor matrix in a database. Each time factor matrix contains time factors for various migration tasks, when at least one attribute is relevant to migrating a specified application from a specified source platform to a specified target platform. Each time factor matrix may set forth factors for migration tasks, with respect to specific applications. Alternatively, each time factor matrix may set forth time factors for migration tasks, with respect to the degree of commonality of various applications. For example, time factor matrices may be built for standard applications (for example, word processors and data storage), non-standard (such as compilers and communication software), and custom-made applications. Matrices may be built to reflect additional qualitative categories of applications that have a quantifiably distinguishable effect on the time requirement for at least one migration task.

Various time factor matrices are described in further detail, below.

One example of a time factor matrix contemplated for returning a Type C assessment is a complexity time factor matrix. Each complexity time factor matrix sets forth factors, comprising the amounts by which the time requirements for various migration tasks are changed by the complexity of migrating an application between a source platform and a target platform. A complexity time factor matrix may conform substantially to that shown in FIG. 9B, wherein a complexity time factor, $^i\psi_{S\text{-}T}$, is shown at the intersection of each row containing a migration task, 'i', and a column containing a source-target combination, 'S-T'. Note that a complexity time factor matrix may contain complexity cost factors for more migration tasks than are received in step 303.

The complexity time factors may comprise proportions by which the base time requirements for migration tasks may be multiplied to reflect the effect of the source-target combination in increasing, decreasing, or not affecting, the average base time requirement for the migration tasks during a migration process. The effect of each source-target combination upon the base time requirement for each migration task, and hence the development of each complexity time factor, $^i\psi_{S\text{-}T}$, will be readily appreciated by those skilled in the art.

A single universal complexity time factor matrix may be used, or many complexity time factor matrices may be used, each one containing factors for only one type of source-target combination, such as UNIX-UNIX; Generic UNIX-UNIX Variant; AIXv(x)-AIXv(x+1); Windows XP-Solaris/Intel; and the like. Species of source and target platforms may be particularized (such as Bull GCOS, DG DG-UX, FreeBSD, HP HP-UX, HP MPE, HP NSK, HP OpenVMS/Alpha, HP OpenVMS/VAX, HP Tru64 UNIX, HP VMS/VAX, IBM AIX, IBM DOS/VSE, IBM DYNIX/ptx, IBM MVS, IBM OS/390, IBM zOS, Intel Linux, SCO UnixWare, SGI Irix, Solaris/Intel, Solaris/SPARC, Windows 9x, Windows NT/200, Windows XP and the like). Species of source and target platforms may be non-particularized (such as common platform, uncommon platform, custom platform, proprietary platform, and the like). Particularized and non-particularized species may be combined on a single complexity time factor matrix and in individual source-target combinations (such as WinXP-proprietary platform).

Once at least one complexity time factor matrix is identified that reflects the source-target combination received in step 301, complexity time factor, $^i\psi_{S\text{-}T}$, for each migration task in the assessment template is obtained from the complexity time factor matrix or matrices. Note that $^i\psi_{S\text{-}T}$ may differ for each migration task.

Another type of time factor matrix that may be used in returning a Type C assessment is a hardware time factor matrix. Each hardware time factor matrix sets forth factors, comprising the amounts by which the time requirements for various migration tasks are changed due to the presence of at least one hardware attribute during migration. A hardware time factor matrix may conform substantially to that shown in FIG. 10, wherein a hardware time factor, $^iH_k$, is shown at the intersection of each row containing a migration task, 'i', and a column containing a hardware attribute combination, Note that a hardware time factor matrix may contain hardware time factors for more migration tasks than are received in step 303.

The hardware time factors may comprise proportions by which the base time requirements for migration tasks may be multiplied to reflect the effect of the difference in the hardware attributes of the source and target platforms, in increasing, decreasing, or not affecting, the average base time requirement of the migration tasks during a migration process. The effect of each hardware attribute combination upon the base time requirement for each migration task, and hence the development of each hardware time factor, $^iH_k$, will be readily appreciated by those skilled in the art.

A single universal hardware time factor matrix may be used, or many hardware time factor matrices may be used, each one containing factors for only one type of hardware attribute combination, such as external interface combinations, media combinations, byte storage sequencing combinations, and the like. Species of hardware attributes may be particularized (such as big endian to little endian, and the like). Species of hardware attributes may be non-particularized (such as, standard connectivity to non-standard connectivity, common processors to custom processors, and the like). Particularized and non-particularized species may be combined on a single hardware time factor matrix.

Once at least one hardware time factor matrix is identified containing the hardware attribute combinations, 1 . . . k, which were received in accordance with step 306, the hardware time factors, $^iH_1 \ldots {}^iH_k$, for each migration task in the assessment template are obtained from the hardware time factor matrix or matrices. Note that $^iH_1 \ldots {}^iH_k$, may differ for each migration task.

Another type of time factor matrix that may be used in returning a Type C assessment is an operating system (OS) time factor matrix. Each OS time factor matrix sets forth factors, comprising the amounts by which the time requirements for various migration tasks are changed due to the operating system operated on the source platform (due to, for example, threads, embedded SQL/RDBMS access, kernel mode routines, clustering functionality, operating system intrinsics, library functions, etc.). An OS time factor matrix may conform substantially to that shown in FIG. 11, wherein an OS time factor, $^i\theta_m$, is shown at the intersection of each row containing a migration task, 'i', and a column containing an operating system, 'm'. Note that an OS time factor matrix may contain OS time factors for more migration tasks than are received in step 303.

The OS time factors may comprise proportions by which the base time requirements for migration tasks may be multiplied to reflect the effect of the dependence of the application upon the initial operating system(s) (due to, for example, threads, embedded SQL/RDBMS access, kernel mode routines, clustering functionality, operating system intrinsics, library functions, etc.) in increasing, decreasing, or not affecting, the average base time requirements for the migration task during a migration process. The effect of each operating system upon the base time requirement for each migration task, and hence the development of each OS time factor, $^i\theta_m$, will be readily appreciated by those skilled in the art.

A single universal OS time factor matrix may be used, or many OS time factor matrices may be used, each one containing factors for only one type of operating system. Species of operating systems may be particularized (such as Microsoft Windows® NT, Sun Solaris® and the like). Species of operating systems may be non-particularized (such as, standard, non-standard, custom, and the like). Particularized and non-particularized species may be combined on a single OS time factor matrix.

Once at least one OS time factor matrix is identified containing the operating systems, 1 . . . m, which were received in accordance with step 306, the OS time factors, $^{i}\theta_{1} \ldots {}^{i}\theta_{m}$, for each migration task in the assessment template are obtained from the OS time factor matrix or matrices. Note that $^{i}\theta_{1} \ldots {}^{i}\theta_{m}$, may differ for each migration task.

Another type of time factor matrix that may be used in returning a Type C assessment is an application time factor matrix. Each application time factor matrix sets forth factors, comprising the amounts by which the time requirements for various migration tasks are changed due to at least one attribute of the application being migrated. An application time factor matrix may conform substantially to that shown in FIG. 12, wherein an application time factor, $^{i}\mathbf{a}_{n}$, is shown at the intersection of each row containing a migration task, and a column containing an application attribute, 'n'. Note that an application time factor matrix may contain application time factors for more migration tasks than are received in step 303.

The application time factors may comprise proportions by which the base times of migration tasks may be multiplied to reflect the effect of application attributes in increasing, decreasing, or not affecting, the average base times of the migration tasks during a migration process. The effect of each application attribute upon the base time requirement for each migration task, and hence the development of each application time factor, $^{i}\mathbf{a}_{n}$, will be readily appreciated by those skilled in the art.

A single universal application time factor matrix may be used, or many application time factor matrices may be used, each one for a single application attribute, such as real-time operation, OLTP, and the like. Species of applications may be non-particularized (such as, standard, non-standard, custom, and the like). Particularized and non-particularized species may be combined on a single application time factor matrix.

Once at least one application time factor matrix is identified containing the application attributes, 1 . . . n, which were received in accordance with step 306, the application time factors, $^{i}\mathbf{a}_{1} \ldots {}^{i}\mathbf{a}_{n}$, for each migration task in the assessment template are obtained from the application time factor matrix or matrices. Note that $^{i}\mathbf{a}_{1} \ldots {}^{i}\mathbf{a}_{n}$ may differ for each migration task.

Another type of time factor matrix that may be used in returning a Type C assessment is an environment time factor matrix. Each environment time factor matrix sets forth factors, comprising the amounts by which the time requirements for various migration tasks are changed due to at least one environment attribute. An environment time factor matrix may conform substantially to that shown in FIG. 13, wherein a environment time factor, $^{i}\chi_{p}$, is shown at the intersection of each row containing a migration task, 'i', and a column containing an environment attribute, 'p'. Note that an environment time factor matrix may contain environment time factors for more migration tasks than are received in step 303.

The factors may comprise proportions by which the base times of migration tasks may be multiplied to reflect the effect of environment attributes in increasing, decreasing, or not affecting, the average base times of the migration tasks during a migration process. The effect of each environment attribute upon the base time requirement for each migration task, and hence the development of each environment time factor, $^{i}\chi_{p}$, will be readily appreciated by those skilled in the art.

A single universal environment time factor matrix may be used, or many environment time factor matrices may be used, each one containing factors for only one type of environment attribute, such as external interface, media, and the like. Species of environment attributes may be particularized (such as 128-bit SSL security, hypertext transfer protocol usage, COBOL language and the like). Species of environment attributes may be non-particularized (such as, standard languages, non-standard security, custom communication transfer protocols, and the like). Particularized and non-particularized species may be combined on a single environment time factor matrix.

Once at least one environment time factor matrix is identified containing the environment attributes, 1 . . . p, which were received in accordance with step 306, the environment time factors, $^{i}\chi_{1} \ldots {}^{i}\chi_{p}$, for each migration task in the assessment template are obtained from the environment time factor matrix or matrices. Note that $^{i}\chi_{1} \ldots {}^{i}\chi_{p}$, may differ for each migration task.

Another type of time factor matrix that may be used in returning a Type C assessment is a testing time factor matrix. Each testing time factor matrix sets forth factors, comprising the amounts by which the times of various migration tasks are changed due to at least one testing attribute. A testing time factor matrix may conform substantially to that shown in FIG. 19, wherein a testing time factor, $^{i}b_{r}$, is shown at the intersection of each row containing a migration task, 'i', and a column containing a testing attribute, 'r'. This example is shown in FIG. 19, where i=2 or 4, because these are the task numbers given to baseline and system testing in the example assessment template shown in FIG. 2.

The factors may comprise proportions by which the base time of baseline test and/or system test may be multiplied to reflect the effect of the testing attribute in increasing, decreasing, or not affecting, the average base time of the baseline testing and/or system testing during a migration process. The effect of each testing attribute upon the base time requirement for baseline testing and system testing, and hence the development of each testing time factor, $^{i}b_{r}$, will be readily appreciated by those skilled in the art.

A single universal testing time factor matrix may be used, or many testing time factor matrices may be used, each one containing factors for only one type of testing attribute, such as re-building the application, use of unit testing, creation of testing programs, testing sites, testing criteria and the like. Species of testing attributes may be particularized (such as no re-building, progressive unit testing, perform baseline test off-site and the like). Species of testing attributes may be non-particularized (such as, standard testing suites, non-standard performance criteria, custom hardware simulation during testing, and the like). Particularized and non-particularized species may be combined on a single testing time factor matrix.

Once at least one testing time factor matrix is identified containing the testing attributes, 1 . . . r, which were received in accordance with step 306, the testing time factors, $^{i}b_{1} \ldots {}^{i}b_{r}$, for baseline and system testing are obtained from the testing time factor matrix or matrices. Note that $^{i}b_{1} \ldots {}^{i}b_{r}$, may differ for each type of testing.

The time requirement for the migration is estimated, in accordance with step 309. The time requirement $f(t_i)$ for each individual migration task shown on the assessment template, other than baseline test and system test, is then estimated as follows:

$$f(t_1) = {}^1T^i\psi_{S-T}({}^iH_1{}^iH_2\ldots{}^iH_k)({}^i\theta_1{}^i\theta_2\ldots{}^i\theta_m)$$
$$({}^i\text{Я}_1{}^i\text{Я}_2\ldots{}^i\text{Я}_n)({}^i\chi_1{}^i\chi\ldots{}^i\chi_p)$$

The time requirement for baseline test is estimated as follows:

$$f(t_2) = {}^2T^2\psi_{S-T}({}^2H_1{}^2H_2\ldots{}^2H_k)({}^2\theta_1{}^2\theta_2\ldots{}^2\theta_m)({}^2\text{Я}_1{}^2$$
$$\text{Я}_2\ldots{}^2\text{Я}_n)({}^2\chi_1{}^2\chi_2\ldots{}^2\chi_p)({}^2b_1\ldots{}^2b_r)$$

The time requirement for system test is estimated as follows:

$$f(t_4) = {}^4T^4\psi_{S-T}({}^4H_1{}^4H_2\ldots{}^4H_k)({}^4\theta_1{}^4\theta_2\ldots{}^4\theta_m)({}^4\text{Я}_1{}^4$$
$$\text{Я}_2\ldots{}^4\text{Я}_n)({}^4\chi_1{}^4\chi_2\ldots{}^4\chi_p)({}^4b_1\ldots{}^4b_r)$$

The time estimate for the migration process shown on the assessment template is estimated as follows:

$$\sum_{i=1}^{i} f(t_i)$$

In accordance with step 310, desired tolerances may be applied in the manner described with reference to FIG. 1. In accordance with step 311, a Type C assessment is output (printed or displayed), which shows estimated costs and/or time requirements for the migration process and each migration task in the assessment template, given the base variables and attributes received. Any such estimates may be represented as fixed numbers or ranges. In the preferred embodiment of the invention, costs and/or time requirements estimated in a Type C assessment are output as ranges.

Figure 14:
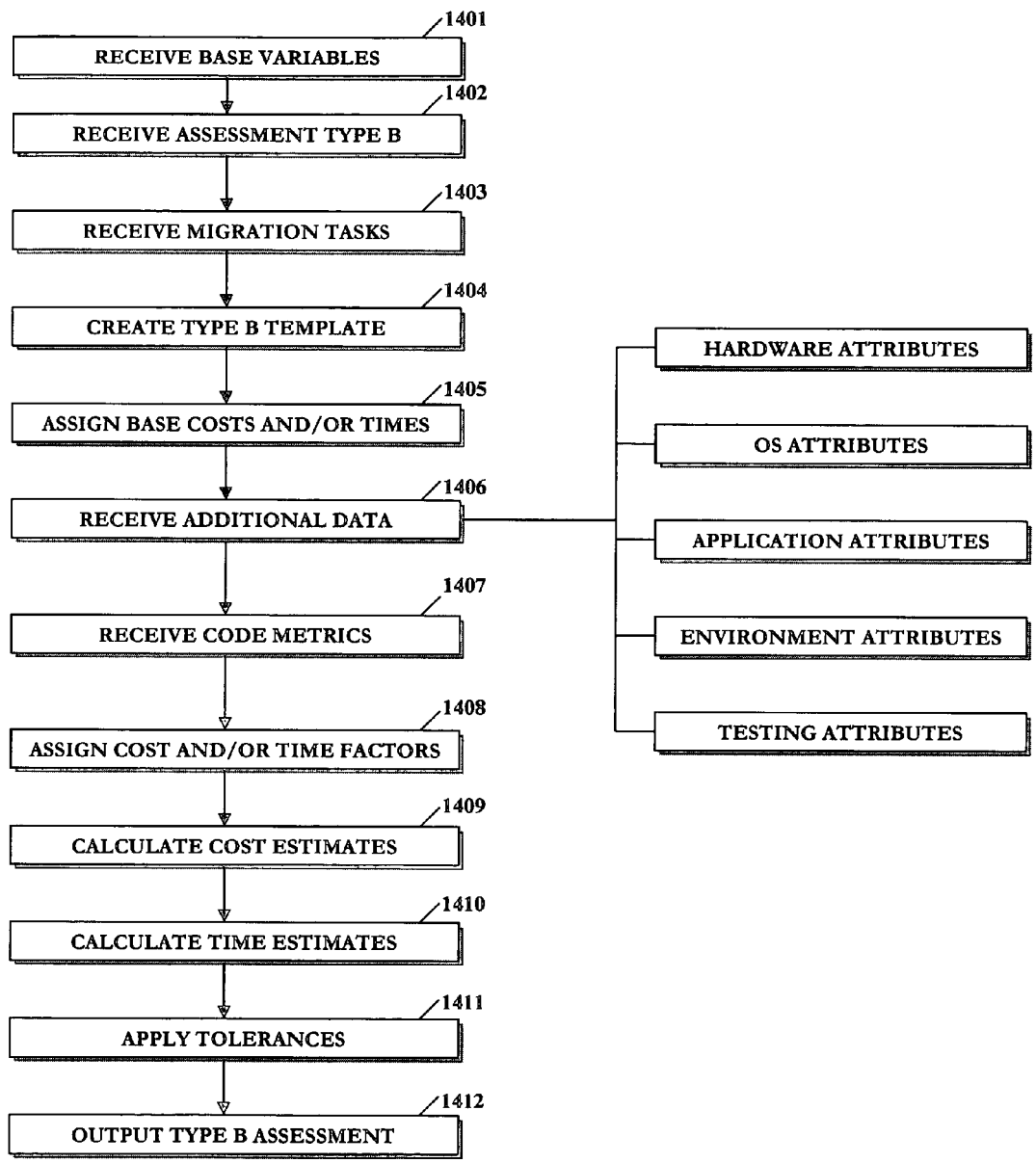
FIG. 14 is a flow diagram illustrating steps of the invented method, wherein a Type B assessment is output, in accordance with the current invention.

FIG. 14 is a flow diagram illustrating a method for returning a Type B assessment for the migration of an application from a source platform to a target platform, in accordance with the current invention. In accordance with step 1401, base variables are received, which comprise an application to be migrated, a source platform on which the application currently operates, and a target platform on which the application is to be re-hosted.

The application variable may comprise a specific application name and version. Alternatively, the application may include the function of the application and (if more than one function) its component parts, such as production control, batch processing, data mining, online transaction processing (OLTP), or other functions. In the preferred embodiment of the invention, the application variable comprises the name, version and function(s) of the application and its component parts.

The source and target platform variables may comprise any platforms suitable for operating the application that is to be migrated. These platforms may include, for example, UNIX (generic or variants), OpenVMS, IBM AS/400 or iSeries, HP 300 MPE, IBM Mainframe, and other platforms that are readily known to those skilled in the art.

In accordance with step 1402, a user's choice of a Type B assessment is received. In accordance with step 1403, an identifier for at least one migration task is received, as described with reference to FIG. 1. In accordance with step 1404, an assessment template may be created in the mariner described with reference to FIG. 1. The assessment template for a Type B assessment preferably comprises a representation of migration tasks, which is not as high-level as a Type C assessment template but not as detailed as a Type A assessment template.

In accordance with step 1405, base costs and/or times are assigned to each migration task. For a Type B assessment, the base variables are preferably compared with at least one base cost matrix in a database. Each base cost matrix sets forth an average base cost for migration tasks, such as those listed previously. A base cost matrix may conform substantially to that shown in FIG. 4A, wherein migration tasks are listed in one column, and a base cost is shown in the row containing a migration task to which the base cost corresponds. A base cost, ${}^i\beta$, is extracted from the database, for each migration task, 'i', received in step 1403. Note that each base cost matrix may contain base cost data for more migration tasks than are received in step 1403.

Each base cost matrix may set forth average costs for migration tasks, with respect to specific applications. Alternatively, each base cost matrix may set forth average base costs for migration tasks, with respect to the degree of commonality of various applications. For example, base cost matrices may be built for standard applications (for example, word processors and data storage), non-standard (such as compilers and communication software), and custom-made applications. Matrices may be built to reflect additional qualitative categories of applications that have a quantifiably distinguishable effect on the cost of at least one migration task.

Where time requirements are being estimated, base time requirements are assigned to each migration task. For a Type B assessment, the base variables are preferably compared with at least one base time matrix in a database. Each base cost matrix sets forth an average base cost for migration tasks, such as those listed previously. A base time requirement matrix may conform substantially to that shown in FIG. 9A, wherein migration tasks are listed in one column, and a base time requirement is shown in the row containing a migration task to which the base time requirement corresponds. A base time, ${}^iT$, is extracted from the database, for each migration task, 'i', received in step 1403. Note that each base cost matrix may contain base time data for more migration tasks than are received in step 1403.

Each base time requirement matrix may set forth average time requirements for migration tasks, with respect to specific applications. Alternatively, each base time matrix may set forth average base time requirements for migration tasks, with respect to the degree of commonality of various applications. For example, base time matrices may be built for standard applications (for example, word processors and data storage), non-standard (such as compilers and communication software), and custom-made applications. Matrices may be built to reflect additional qualitative categories of applications that have a quantifiably distinguishable effect on the time requirement for at least one migration task.

In accordance with step 1406, at least one additional attribute is received. The migration attributes may comprise, for example, hardware attributes, current operating system attributes, attributes of the application to be migrated, environment attributes, or testing attributes, as these are described with reference to FIG. 3, above.

In addition to the attributes described above, code metrics are also received, in accordance with 1407. Code metrics may comprise those attributes of the source code of the application being migrated, as those are described with reference to FIG. 1, above. Code metrics are separated into two categories: qualitative and numeric. Qualitative code metrics include such parameters as structural integrity of the application, whether lexical functions are used, the degree to which the application is dependent upon its current operating system, and other code metrics that are not intended to express an actual quantity (even though degrees of a qualitative code metric may be identified by representative numbers). Numeric code metrics include such parameters as code line inventories, code module inventories, file inventories, call and call type inventories, data volume, and other measurable quantities of source code attributes. Code metrics are described further with reference to assignment of factors in step 1408, below.

Code metrics may be received directly from a user. Alternatively, the source code may be received and analyzed using a suitable utility program for analyzing application source code and returning metrics such as those described herein. The source code may be received via remote electronic transmission to a computing device—via ftp or e-mail, for example—or physical delivery of computer-readable media followed by entry onto a computer system. In one embodiment, the source code is delivered on computer-readable media and then disposed onto a server computer, desktop computer, laptop computer, or other computing device suitable for assessing the source code. In another embodiment, the code may be transmitted via e-mail or ftp to an assessment server or other computing device suitable for analyzing the source code.

The metric utility may comprise any computer-implemented utility suitable for analyzing application source code and returning code metrics, such as line counts, per type of code; keyword inventories, whether by individual keyword or categories of keywords, such as procedural keywords, data keywords, environment keywords, identification keywords and the like; inventories of files and directory types, such as source code files, copybook files, COM files and the like; or lexical functions; structural integrity; data volume; operating system dependencies; calls and call types to keywords or lexical functions; and other measurable properties of source code that may impact upon the time and cost for migrating an application from a source platform to a target platform.

In accordance with step 1408, cost and/or time factors corresponding to each attribute received in step 1406, and corresponding to the base variables, are assigned to each migration task received in step 1403. For a Type B assessment, cost factors corresponding to complexity, operating system attributes, hardware attributes, application attributes, environment attributes, and testing attributes, are assigned using matrices, in the manners described with reference to FIG. 3.

Additionally, cost factors corresponding to code metrics received in step 1407 are also assigned to the migration tasks received in step 1403. Qualitative code metrics obtained are compared with at least one code cost factor matrix. Each code cost factor matrix sets forth factors, comprising the amounts by which the costs of various migration tasks are changed due to the presence of at least one qualitative attribute in the source code of the application to be re-hosted. A code cost factor matrix may conform substantially to that shown in FIG. 15, wherein a qualitative code cost factor $^i\kappa_q$ is shown at the intersection of each row containing a migration task, 'i', and a column containing a qualitative code metric, 'q'. Note that a code cost factor matrix may contain code cost factors for more migration tasks than are received in step 1403.

The qualitative code cost factors may comprise proportions by which the base cost of migration tasks may be multiplied to reflect the effect of the qualitative code metric in increasing, decreasing, or not affecting, the average base cost for the migration tasks during the migration process. The effect of each qualitative code metric upon the average base cost for each migration task, and hence the development of each qualitative code cost factor, $^i\kappa_q$, will be readily appreciated by those skilled in the art.

A single universal code cost factor matrix may be used, or many code cost factor matrices may be used, each one containing only one type of qualitative code metric. Qualitative code metrics may be expressed in dual form (such as, structural integrity=YES; operating system dependent=NO; lexical functions=YES). Alternatively, qualitative code metrics may be categorized by degree (such as, low structural integrity; negligible dependence upon operating system; high use of lexical functions). Dual and categorized qualitative code metric representations may be combined on a single code cost factor matrix.

Once at least one code cost factor matrix is identified containing the qualitative code metrics, 1 . . . q, which were received in accordance with step 1407, the qualitative code cost factors, $^i\kappa_1 \ldots {}^i\kappa_q$, for each migration task in the assessment template are obtained from the code cost factor matrix or matrices. Note that $^i\kappa_1 \ldots {}^i\kappa_q$ may differ for each migration task.

Because an actual quantity is returned for numeric code metrics, the effect of a numeric code metric, 's', on the cost of a migration task, 'i', may be accounted for formulaically. As the value returned for the metric (such as number of code lines) increases or decreases, then a numeric code cost factor, $^i\phi_s$, may simply be calculated by an appropriate function, or a group of functions that differ for each type of numeric code metric, 1 . . . s. The functions used to calculate each numeric code cost factor, $^i\phi_s$, may have linear elements, geometric elements, differential elements, or any combination of the three. Additionally, the functions may reflect benchmarks, wherein a numeric code cost factor remains constant over a range of values for the numeric code metric. The effect of each numeric code metric upon the average base cost for each migration task, and hence the formulae for calculating each numeric code cost factor, $^i\phi_s$, will be readily appreciated by those skilled in the art.

Once factors for each numeric code metric, 1 . . . s, which were received in accordance with step 1407, are calculated for each migration task 'i', then a set of numeric code cost factors, $^i\phi_1 \ldots {}^i\phi_s$, is obtained for each migration task. Note that the numeric code cost factors $^i\phi_1 \ldots {}^i\phi_s$ may differ for each migration task.

In accordance with step 1409, the estimated cost $f(c_i)$ for each migration task in the assessment template is calculated. The calculation of estimated cost is achieved by applying the cost factors assigned in step 1408 to the base costs assigned in step 1405. Integrating the factors assigned for the code metrics received in step 1407, with the equations described with reference to FIG. 3, the cost $f(c_i)$ for each individual migration task received in step 1403, other than baseline test and system test, is then estimated as follows:

$$f(c_i) = {}^i\beta^i\lambda_{S-T}({}^ih_1{}^ih_2 \ldots {}^ih_n)({}^i\omega_1{}^i\omega_2 \ldots {}^i\omega_m)({}^i\alpha_1{}^i\alpha_2 \ldots {}^i\alpha_n)({}^i\epsilon_1{}^i\epsilon_2 \ldots {}^i\epsilon_p)({}^i\kappa_1{}^i\kappa_2 \ldots {}^i\kappa_q)({}^i\phi_1{}^i\phi_2 \ldots {}^i\phi_s)$$

The cost $f(c_2)$ for baseline test is estimated as follows:

$$f(c_2) = {}^2\beta^2\lambda_{S-T}({}^2h_1{}^2h_2 \ldots {}^2h_n)({}^2\omega_1{}^2\omega_2 \ldots {}^2\omega_m)\\({}^2\alpha_1{}^2\alpha_2 \ldots {}^2\alpha_n)({}^2\epsilon_1{}^2\epsilon_2 \ldots {}^2\epsilon_p)({}^2\kappa_1{}^2\kappa_2 \ldots {}^2\kappa_q)\\({}^2\phi_1{}^2\phi_2 \ldots {}^2\phi_s)({}^2\eta_1 \ldots {}^2\eta_r).$$

The cost $f(c_4)$ for system test is estimated as follows:

$$f(c_4) = {}^4\beta^4\lambda_{S-T}({}^4h_1{}^4h_2 \ldots {}^4h_n)({}^4\omega_1{}^4\omega_2 \ldots {}^4\omega_m)\\({}^4\alpha_1{}^4\alpha_2 \ldots {}^4\alpha_n)({}^4\epsilon_1{}^4\epsilon_2 \ldots {}^4\epsilon_p)({}^4\kappa_1{}^4\kappa_2 \ldots {}^4\kappa_q)\\({}^4\phi_1{}^4\phi_2 \ldots {}^4\phi_s)({}^4\eta_1 \ldots {}^4\eta_r).$$

The cost estimate for the migration process shown on the assessment template is estimated as follows:

$$\sum_{i=1}^{i} f(c_i)$$

Where time requirements are estimated, step 1408 includes assignment of time factors to each migration task. For a Type B assessment, time factors corresponding to complexity, operating system attributes, hardware attributes, application attributes, environment attributes, and testing attributes, are assigned using matrices, in the manners described with reference to FIG. 3.

Additionally, time factors corresponding to code metrics received in step 1407 are also assigned to the migration tasks received in step 1403. Qualitative code metrics are compared with at least one code time factor matrix. Each code time factor matrix sets forth factors, comprising the amounts by which the time requirements of various migration tasks are changed due to the presence of at least one qualitative attribute in the source code of the application to be re-hosted. A code time factor matrix may conform substantially to that shown in FIG. 17, wherein a qualitative code time factor, $^i\mu_q$, is shown at the intersection of each row containing a migration task, 'i', and a column containing a specie of qualitative code metric, 'q'. Note that a code time factor matrix may contain code time factors for more migration tasks than are received in step 1403.

The qualitative code time factors may comprise proportions by which the base time requirements for migration tasks may be multiplied to reflect the effect of the qualitative code metric in increasing, decreasing, or not affecting, the average base time requirement for the migration tasks during the migration process. The effect of each qualitative code metric upon the average base time requirement for each migration task, and hence the development of each qualitative code time factor, $^i\mu_q$, will be readily appreciated by those skilled in the art.

A single universal code time factor matrix may be used, or many code time factor matrices may be used, each one containing only one type of qualitative code metric. Qualitative code metrics may be expressed in dual form (such as, structural integrity=YES; operating system dependent=NO; lexical functions=YES). Alternatively, species of qualitative code metrics may be categorized by degree (such as, low structural integrity; negligible dependence upon operating system; high use of lexical functions). Dual and categorized qualitative code metric representations may be combined on a single code time factor matrix.

Once at least one code time factor matrix is identified containing the qualitative code metrics, 1 . . . q, which were returned in accordance with step 1407, the qualitative code time factors, $^i\mu_1 \ldots {}^i\mu_q$, for each migration task in the assessment template are obtained from the code time factor matrix or matrices. Note that $^i\mu_1 \ldots {}^i\mu_q$ may differ for each migration task.

Because an actual quantity is returned for numeric code metrics, the effect of a numeric code metric, 's', on the time requirement for a migration task, may be accounted for formulaically. As the value returned for the metric (such as number of code lines) increases or decreases, then a numeric code time factor, $^iv_s$, may simply be calculated by an appropriate function, or a group of functions that differ for each type of numeric code metric, 1 . . . s. The functions used to calculate each numeric code time factor, $^iv_s$, may have linear elements, geometric elements, differential elements, or any combination of the three. Additionally, the functions may reflect benchmarks, wherein a numeric code time factor remains constant over a range of values for the numeric code metric. The effect of each numeric code metric upon the average base time requirement for each migration task, and hence the formulae for calculating each numeric code time factor, $^iv_s$, will be readily appreciated by those skilled in the art.

Once factors for each numeric code metric, 1 . . . s, which were returned in accordance with step 1409, are calculated for each migration task 'i', then a set of numeric code time factors, $^iv_1 \ldots {}^iv_s$, is obtained for each migration task. Note that $^iv_1 \ldots {}^iv_s$ may differ for each migration task.

In accordance with step 1410, the time requirement for the migration is estimated. The calculation of estimated time is achieved by applying the time factors assigned in step 1408 to the base costs assigned in step 1405. Integrating the time factors assigned for the code metrics received in step 1407, with the equations described with reference to FIG. 3, the time requirement $f(t_i)$ for each individual migration task shown on the assessment template, other than baseline test and system test, is estimated as follows:

$$f(t_i) = {}^iT^i\psi_{S-T}({}^iH_1{}^iH_2 \ldots {}^iH_k)({}^i\theta_1{}^i\theta_2 \ldots {}^i\theta_m) \\ ({}^i\mathbf{A}_1{}^i\mathbf{A}_2 \ldots {}^i\mathbf{A}_n)({}^i\chi_1{}^i\chi_2 \ldots {}^i\chi_p)({}^i\mu_1{}^i\mu_2 \ldots {}^i\mu_q) \\ ({}^iv_1{}^iv_2 \ldots {}^iv_s)$$

The time requirement for baseline test is estimated as follows:

$$f(t_2) = {}^2T^2\psi_{S-T}({}^2H_1{}^2H_2 \ldots {}^2H_k)({}^2\theta_1{}^2\theta_2 \ldots {}^2\theta_m)({}^2\mathbf{A}_1{}^2 \\ \mathbf{A}_2 \ldots {}^2\mathbf{A}_n)({}^2\chi_1{}^2\chi_2 \ldots {}^2\chi_p)({}^2\mu_1{}^2\mu_2 \ldots {}^2\mu_q) \\ ({}^2v_1{}^2v_2 \ldots {}^2v_s)({}^2b_1 \ldots {}^2b_r)$$

The time requirement for system test is estimated as follows:

$$f(t_4) = {}^4T^4\psi_{S-T}({}^4H_1{}^4H_2 \ldots {}^4H_k)({}^4\theta_1{}^4\theta_2 \ldots {}^4\theta_m)({}^4\mathbf{A}_1{}^4 \\ \mathbf{A}_2 \ldots {}^4\mathbf{A}_n)({}^4\chi_1{}^4\chi_2 \ldots {}^4\chi_p)({}^4\mu_1{}^4\mu_2 \ldots {}^4\mu_q) \\ ({}^4v_1{}^4v_2 \ldots {}^4v_s)({}^4b_1 \ldots {}^4b_r)$$

The time estimate for the migration process shown on the assessment template is estimated as follows:

$$\sum_{i=1}^{i} f(t_i)$$

In accordance with step 1411, desired tolerances are applied in the manner described with reference to FIG. 1. In accordance with step 1412, a Type B assessment is output (printed or displayed), which shows estimated costs and/or time requirements for the migration process and each migration task in the assessment template, given the base variables, attributes and code metrics received. Any such estimates may be represented as fixed numbers or ranges. In the preferred embodiment of the invention, costs and/or time requirements estimated in a Type B assessment are output as ranges.

Figure 16:
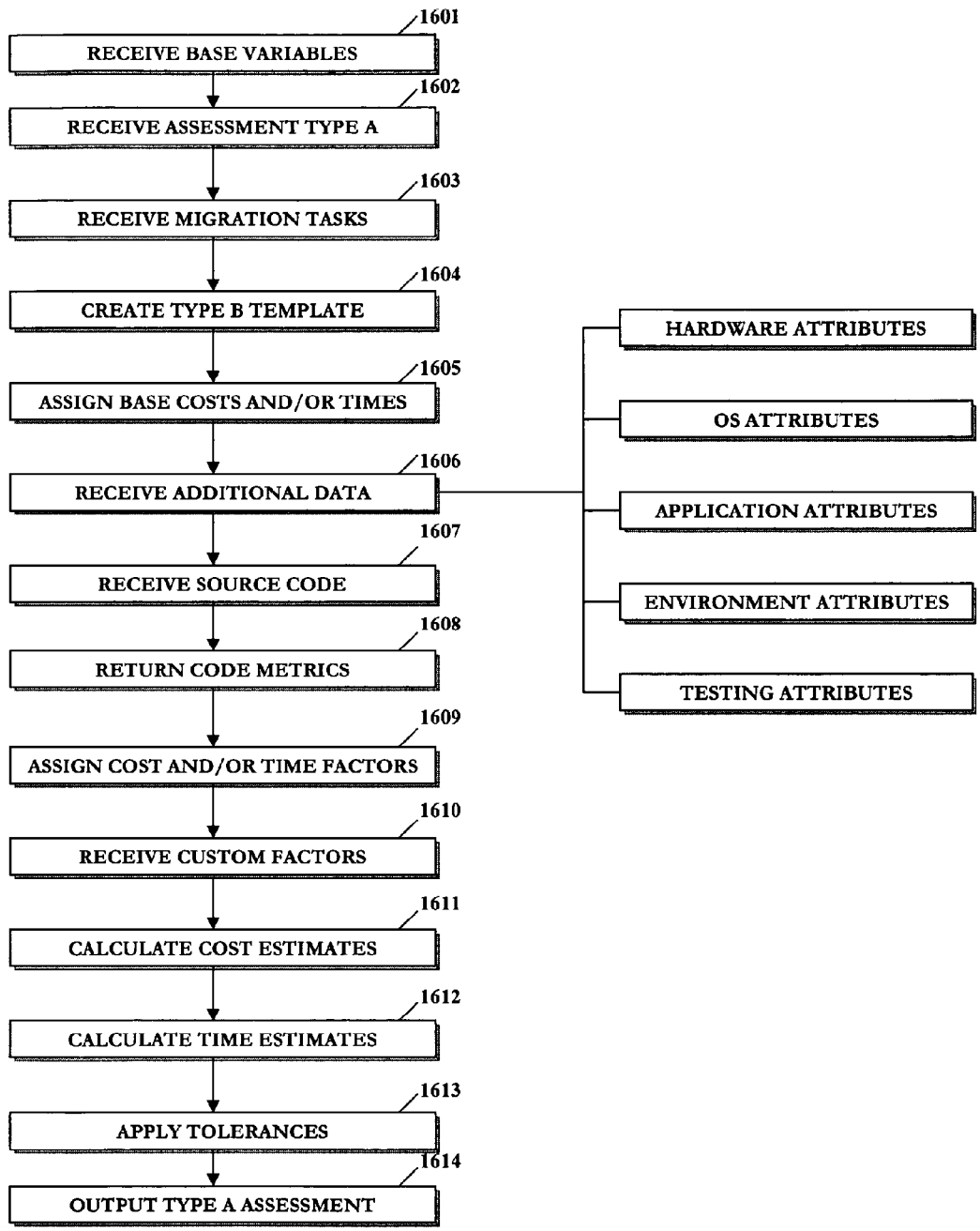
FIG. 16 is a flow diagram illustrating steps of the invented method, wherein a Type A assessment is output, in accordance with the current invention.

FIG. 16 is a flow diagram illustrating a method for returning a Type A assessment for the migration of an application from a source platform to a target platform, in accordance with the current invention. In accordance with step 1601, base variables are received, which comprise an application to be migrated, a source platform on which the application currently operates, and a target platform on which the application is to be re-hosted.

The application variable may comprise a specific application name and version. Alternatively, the application may include the function of the application and (if more than one function) its component parts, such as production control, batch processing, data mining, online transaction processing (OLTP), or other functions. In the preferred embodiment of the invention, the application variable comprises the name, version and function(s) of the application and its component parts.

The source and target platform variables may comprise any platforms suitable for operating the computer-based application to be migrated. These platforms may include, for example, UNIX (generic or variants), OpenVMS, IBM AS/400 or iSeries, HP 300 MPE, IBM Mainframe, and other platforms that are readily known to those skilled in the art.

In accordance with step 1602, a user's choice of a Type B assessment is received. In accordance with step 1603, an identifier for at least one migration task is received, as described with reference to FIG. 1. In accordance with step 1604, an assessment template may be created in the manner described with reference to FIG. 1. The assessment template should contain both high-level tasks and the low-level tasks associated with each, such that cost and time requirements will be estimated in great detail, when compared to a Type C or Type B assessment.

In accordance with step 1605, base costs and/or times are assigned to each migration task. For a Type A assessment, the base variables are preferably compared with at least one base cost matrix in a database. Each base cost matrix sets forth an average base cost for migration tasks, such as those listed previously. A base cost matrix may conform substantially to that shown in FIG. 4A, wherein migration tasks are listed in one column, and a base cost is shown in the row containing a migration task to which the base cost corresponds. A base cost, $^i\beta$, is extracted from the database, for each migration task, 'i', received in step 1603. Note that each base cost matrix may contain base cost data for more migration tasks than are received in step 1603.

Each base cost matrix may set forth average costs for migration tasks, with respect to specific applications. Alternatively, each base cost matrix may set forth average base costs for migration tasks, with respect to the degree of commonality of various applications. For example, base cost matrices may be built for standard applications (for example, word processors and data storage), non-standard (such as compilers and communication software), and custom-made applications. Matrices may be built to reflect additional qualitative categories of applications that have a quantifiably distinguishable effect on the cost of at least one migration task.

Where time requirements are being estimated, base time requirements are assigned to each migration task. For a Type A assessment, the base variables are preferably compared with at least one base time matrix in a database. Each base cost matrix sets forth an average base cost for migration tasks, such as those listed previously. A base time requirement matrix may conform substantially to that shown in FIG. 9A, wherein migration tasks are listed in one column, and a base time requirement is shown in the row containing a migration task to which the base time requirement corresponds. A base time, $^iT$, is extracted from the database, for each migration task, 'i', received in step 1603. Note that each base cost matrix may contain base time data for more migration tasks than are received in step 1603.

Each base time requirement matrix may set forth average time requirements for migration tasks, with respect to specific applications. Alternatively, each base time matrix may set forth average base time requirements for migration tasks, with respect to the degree of commonality of various applications. For example, base time matrices may be built for standard applications (for example, word processors and data storage), non-standard (such as compilers and communication software), and custom-made applications. Matrices may be built to reflect additional qualitative categories of applications that have a quantifiably distinguishable effect on the time requirement for at least one migration task.

In accordance with step 1606, at least one migration attribute is received. The migration attributes may comprise, for example, hardware attributes, current operating system attributes, attributes of the application to be migrated, environment attributes, or testing attributes, as these are described with reference to FIG. 3, above. To achieve the level of detail required for a Type A assessment to be distinguishable from a Type B assessment, however, additional attributes may need to be considered.

For a Type A assessment, additional hardware attributes are received that will enable a more accurate cost analysis and plan. Such additional hardware attributes may include, for example, whether the application operates on multiple systems; user connection types (dial-up, serial, WAN, LAN, etc.); and the existence and currency of hardware architecture documentation.

For a Type A assessment, additional application attributes are received that will enable a more accurate cost analysis and plan. Such additional application attributes may include, for example, unique porting complexities; and whether previous unsuccessful portings have been attempted. Such additional application attributes may also include the existence and currency of application documentation, such as documentation for system and functional requirements; application architecture diagrams; subsystem top-level diagrams; module hierarchical diagrams; user documentation; Y2K documentation; and programming standards documentation.

For a Type A assessment, additional environment attributes are received that will enable a more accurate cost analysis and plan. Such additional environment attributes may include, for example, how the application is partitioned (client/server, multi-threaded, one large module, discrete modules executable via CALL or ECTL); embedded SQL or DL/I access; and whether the application is X/Open XA compliant.

Such additional environment attributes may also include, for example, configuration management tools on the source platform (e.g., Panvalet, Librarian); preferred configuration management tools on the target platform; the last re-building of the application; executable images in the application; and whether the application links with non-standard object libraries.

Such additional environment attributes may also include operating system dependencies, such as multinational character sets; user-written ISPF panels; inter-process communication; SYSPLEX functionality; MACRO calls; CSP map usage; internal EBCDIC coding dependencies; and other such dependencies.

Such additional environment attributes may also include data storage and access attributes other than type, size and configuration of databases and tables, such as needs to access archived data after migration; timing constraints for cutover; whether data can be accessed on media other than disks; import/export data from/to outside systems; type and size of native files; whether native language I/O are used to access native data files; and whether the application shares data sets with other systems.

Such additional environment attributes may also include third party products used to implement or augment any of the environment attributes described herein.

In accordance with step 1607, the source code of the application to be migrated is received. The source code may be received via remote electronic transmission to a computing device—via ftp or e-mail, for example—or physical delivery of computer-readable media followed by entry onto a computer system. In one embodiment, the source code is delivered on computer-readable media and then disposed onto a server computer, desktop computer, laptop computer, or other computing device suitable for assessing the source code. In another embodiment, the code may be transmitted via e-mail or ftp to an assessment server or other computing device suitable for analyzing the source code.

In accordance with step 1608, metrics are returned for the source code received in step 1607. This may be accomplished by analyzing the source code using a metric utility. The code metrics to be returned may be defined prior to or after analysis of the source code, and may include qualitative and/or numeric code metrics, such as those described previously. The metric utility may comprise any computer-implemented utility suitable for analyzing application source code and returning code metrics, such as line counts, per type of code; keyword inventories, whether by individual keyword or categories of keywords, such as procedural keywords, data keywords, environment keywords, identification keywords and the like; inventories of files and directory types, such as source code files, copybook files, COM files and the like; or lexical functions; structural integrity; data volume; operating system dependencies; calls and call types to keywords or lexical functions; and other measurable properties of source code that may impact upon the time and cost for migrating an application from a source platform to a target platform.

In accordance with step 1609, cost and/or time factors corresponding to each attribute received in step 1606, and corresponding to the base variables, are assigned to each migration task received in step 1603. For a Type A assessment, cost factors corresponding to complexity, operating system attributes, hardware attributes, application attributes, environment attributes, and testing attributes, are assigned using matrices, in the manners described with reference to FIG. 3.

Additionally, cost factors corresponding to code metrics received in step 1608 are also assigned to the migration tasks received in step 1603. Qualitative code metrics obtained are compared with at least one code cost factor matrix. Each code cost factor matrix sets forth factors, comprising the amounts by which the costs of various migration tasks are changed due to the presence of at least one qualitative attribute in the source code of the application to be re-hosted. A code cost factor matrix may conform substantially to that shown in FIG. 15, wherein a qualitative code cost factor $^{i}\kappa_{q}$ is shown at the intersection of each row containing a migration task, 'i', and a column containing a qualitative code metric, 'q'. Note that a code cost factor matrix may contain code cost factors for more migration tasks than are received in step 1603.

The qualitative code cost factors may comprise proportions by which the base cost of migration tasks may be multiplied to reflect the effect of the qualitative code metric in increasing, decreasing, or not affecting, the average base cost for the migration tasks during the migration process. The effect of each qualitative code metric upon the average base cost for each migration task, and hence the development of each qualitative code cost factor, $^{i}\kappa_{q}$, will be readily appreciated by those skilled in the art.

A single universal code cost factor matrix may be used, or many code cost factor matrices may be used, each one containing only one type of qualitative code metric. Qualitative code metrics may be expressed in dual form (such as, structural integrity=YES; operating system dependent=NO; lexical functions=YES). Alternatively, qualitative code metrics may be categorized by degree (such as, low structural integrity; negligible dependence upon operating system; high use of lexical functions). Dual and categorized qualitative code metric representations may be combined on a single code cost factor matrix.

Once at least one code cost factor matrix is identified containing the qualitative code metrics, 1 . . . q, which were received in accordance with step 1608, the qualitative code cost factors, $^{i}\kappa_{1} \ldots {}^{9}\kappa_{q}$, for each migration task in the assessment template are obtained from the code cost factor matrix or matrices. Note that $^{i}\kappa_{1} \ldots {}^{i}\kappa_{q}$ may differ for each migration task.

Because an actual quantity is returned for numeric code metrics, the effect of a numeric code metric, 's', on the cost of a migration task, 'i', may be accounted for formulaically. As the value returned for the metric (such as number of code lines) increases or decreases, then a numeric code cost factor, $^{i}\phi_{s}$, may simply be calculated by an appropriate function, or a group of functions that differ for each type of numeric code metric, 1 . . . s. The functions used to calculate each numeric code cost factor, $^{i}\phi_{s}$, may have linear elements, geometric elements, differential elements, or any combination of the three. Additionally, the functions may reflect benchmarks, wherein a numeric code cost factor remains constant over a range of values for the numeric code metric. The effect of each numeric code metric upon the average base cost for each migration task, and hence the formulae for calculating each numeric code cost factor, $^{i}\phi_{s}$, will be readily appreciated by those skilled in the art.

Once factors for each numeric code metric, 1 . . . s, which were received in accordance with step 1608, are calculated for each migration task 'i', then a set of numeric code cost factors, $^{i}\phi_{1} \ldots {}^{i}\phi_{s}$, is obtained for each migration task. Note that the numeric code cost factors $^{i}\phi_{1} \ldots {}^{i}\phi_{s}$ may differ for each migration task.

In accordance with step 1610, a plurality of customized cost factors $^{i}\gamma_{1} \ldots {}^{i}\gamma_{t}$ are received from a user for at least one migration task, 'i', and at least one additional attribute, 't'. Customized cost factors may be received from a user, in relation to the attributes described with reference to step 1606, or the code metrics returned in step 1608, in place of any factors obtained using the matrices or calculations described herein. The customized cost factors may also relate to attributes not contained in such matrices, which the user desires to include in cost estimation. The customized cost factors, $^{i}\gamma_{1} \ldots {}^{i}\gamma_{t}$, may be received in list form, or they may be filled in on a matrix template or multiple matrix templates, for storage and later reference.

Customized cost factors may comprise proportions by which the base cost of migration tasks may be multiplied to reflect the effect of additional attributes in increasing, decreasing, or not affecting, the average base cost of the migration tasks during a migration process. The effect of each additional attribute upon the base cost of each migration task, and hence the development of each customized cost factor, $^{i}\gamma_{t}$, will be readily appreciated by those skilled in the art. Note that $^{i}\gamma_{1} \ldots {}^{i}\gamma_{t}$ may differ for each migration task.

In accordance with step 1611, the estimated cost $f(c_{i})$ for each migration task in the assessment template is calculated. The calculation of estimated cost is achieved by applying the cost factors assigned in step 1609 and the custom factors received in 1610 to the base costs assigned in step 1605. Integrating the factors assigned for the code metrics received in step 1609, and the custom cost factors received in step 1610, with the equations described with reference to FIG. 3, the cost $f(c_{i})$ for each individual migration task received in step 1603, other than baseline test and system test, is estimated as follows:

$$f(c_i) = {}^{i}\beta {}^{i}\lambda_{S-T}({}^{i}h_1{}^{i}h_2 \ldots {}^{i}h_n)({}^{i}\omega_1{}^{i}\omega_2 \ldots {}^{i}\omega_m)({}^{i}\alpha_1{}^{i}\alpha_2 \ldots {}^{i}\alpha_n)({}^{i}\epsilon_1{}^{i}\epsilon_2 \ldots {}^{i}\epsilon_p)({}^{i}\kappa_1{}^{i}\kappa_2 \ldots {}^{i}\kappa_q)({}^{i}\phi_1{}^{i}\phi_2 \ldots {}^{i}\phi_s)({}^{i}\gamma_1{}^{i}\gamma_2 \ldots {}^{i}\gamma_t)$$

The cost $f(c_2)$ for baseline test is estimated as follows:

$$f(c_2) = {}^2\beta^2 \lambda_{S-T} ({}^2h_1{}^2h_2 \ldots {}^2h_n)({}^2\omega_1{}^2\omega_2 \ldots {}^2\omega_m)$$
$$({}^2\alpha_1{}^2\alpha_2 \ldots {}^2\alpha_n)({}^2\epsilon_1{}^2\epsilon_2 \ldots {}^2\epsilon_p)({}^2\kappa_1{}^2\kappa_2 \ldots {}^2\kappa_q)$$
$$({}^2\phi_1{}^2\phi_2 \ldots {}^2\phi_s)({}^2\gamma_1{}^2\gamma_2 \ldots {}^2\gamma_t)({}^2\eta_1 \ldots {}^2\eta_r).$$

The cost $f(c_4)$ for system test is estimated as follows:

$$f(c_4) = {}^4\beta^4 \lambda_{S-T} ({}^4h_1{}^4h_2 \ldots {}^4h_n)({}^4\omega_1{}^4\omega_2 \ldots {}^4\omega_m)$$
$$({}^4\alpha_1{}^4\alpha_2 \ldots {}^4\alpha_n)({}^4\epsilon_1{}^4\epsilon_2 \ldots {}^4\epsilon_p)({}^4\kappa_1{}^4\kappa_2 \ldots {}^4\kappa_q)$$
$$({}^4\phi_1{}^4\phi_2 \ldots {}^4\phi_s)({}^4\gamma_1{}^4\gamma_2 \ldots {}^4\gamma_t)({}^4\eta_1 \ldots {}^4\eta_r).$$

The cost estimate for the migration process shown on the assessment template is estimated as follows:

$$\sum_{i=1}^{i} f(c_i)$$

Where time requirements are estimated, step 1609 includes assignment of time factors to each migration task. For a Type A assessment, time factors corresponding to complexity, operating system attributes, hardware attributes, application attributes, environment attributes, and testing attributes, are assigned using matrices, in the manners described with reference to FIG. 3.

Additionally, time factors corresponding to code metrics returned in step 1608 are also assigned to the migration tasks received in step 1603. Qualitative code metrics are compared with at least one code time factor matrix. Each code time factor matrix sets forth factors, comprising the amounts by which the time requirements of various migration tasks are changed due to the presence of at least one qualitative attribute in the source code of the application to be re-hosted. A code time factor matrix may conform substantially to that shown in FIG. 17, wherein a qualitative code time factor, ${}^i\mu_q$, is shown at the intersection of each row containing a migration task, 'i', and a column containing a specie of qualitative code metric, 'q'. Note that a code time factor matrix may contain code time factors for more migration tasks than are received in step 1603.

The qualitative code time factors may comprise proportions by which the base time requirements for migration tasks may be multiplied to reflect the effect of the qualitative code metric in increasing, decreasing, or not affecting, the average base time requirement for the migration tasks during a migration process. The effect of each qualitative code metric upon the average base time requirement for each migration task, and hence the development of each qualitative code time factor, ${}^i\mu_q$, will be readily appreciated by those skilled in the art.

A single universal code time factor matrix may be used, or many code time factor matrices may be used, each one containing only one type of qualitative code metric. Qualitative code metrics may be expressed in dual form (such as, structural integrity=YES; operating system dependent=NO; lexical functions=YES). Alternatively, species of qualitative code metrics may be categorized by degree (such as, low structural integrity; negligible dependence upon operating system; high use of lexical functions). Dual and categorized qualitative code metric representations may be combined on a single code time factor matrix.

Once at least one code time factor matrix is identified containing the qualitative code metrics, 1 ... q, which were returned in accordance with step 1608, the qualitative code time factors, ${}^i\mu_1 \ldots {}^i\mu_q$, for each migration task in the assessment template are obtained from the code time factor matrix or matrices. Note that ${}^i\mu_1 \ldots {}^i\mu_q$ may differ for each migration task.

Because an actual quantity is returned for numeric code metrics, the effect of a numeric code metric, 's', on the time requirement for a migration task, 'i', may be accounted for formulaically. As the value returned for the metric (such as number of code lines) increases or decreases, then a numeric code time factor, ${}^iv_s$, may simply be calculated by an appropriate function, or a group of functions that differ for each type of numeric code metric, 1 ... s. The functions used to calculate each numeric code time factor, ${}^iv_s$, may have linear elements, geometric elements, differential elements, or any combination of the three. Additionally, the functions may reflect benchmarks, wherein a numeric code time factor remains constant over a range of values for the numeric code metric. The effect of each numeric code metric upon the average base time requirement for each migration task, and hence the formulae for calculating each numeric code time factor, ${}^iv_s$, will be readily appreciated by those skilled in the art.

Once factors for each numeric code metric, 1 ... s, which were returned in accordance with step 1608, are calculated for each migration task 'i', then a set of numeric code time factors, ${}^iv_1 \ldots {}^iv_s$, is obtained for each migration task. Note that ${}^iv_1 \ldots {}^iv_s$ may differ for each migration task.

Also, where time requirements are estimated, a plurality of customized time factors, ${}^i\sigma_1 \ldots {}^i\sigma_t$, may be received from a user, in accordance with step 1610, for at least one migration task, 'i', and at least one additional attribute, 't'. Customized time factors may be received from a user, in relation to the attributes described with reference to step 1606, or the code metrics returned in step 1608, in place of any factors obtained using the matrices or calculations described herein. The customized time factors may also relate to attributes not contained in such matrices, which the user desires to include in estimation of time requirements. The customized time factors, ${}^i\sigma_1 \ldots {}^i\sigma_t$, may be received in list form, or they may be filled in on a matrix template or multiple matrix templates, for storage and later reference.

Customized time factors may comprise proportions by which the base time of migration tasks may be multiplied to reflect the effect of the additional attribute in increasing, decreasing, or not affecting, the average base time requirement for the migration tasks during a migration process. The effect of each additional attribute upon the base time requirement for each migration task, and hence the development of each customized time factor, ${}^i\sigma_t$, will be readily appreciated by those skilled in the art. Note that ${}^i\sigma_1 \ldots {}^i\sigma_t$ may differ for each migration task.

In accordance with step 1612, the time requirement for the migration is estimated. The calculation of estimated time is achieved by applying the time factors assigned in step 1609 and the custom factors received in step 1610 to the base costs assigned in step 1605. Integrating the time factors assigned for the code metrics returned in step 1608, and the custom time factors received in step 1610, with the equations described with reference to FIG. 3, the time requirement $f(t_i)$ for each individual migration task shown on the assessment template, other than baseline test and system test, is estimated as follows:

$$f(t_i) = {}^iT^i\psi_{S-T}({}^iH_1{}^iH_2 \ldots {}^iH_k)({}^i\theta_1{}^i\theta_2 \ldots {}^i\theta_m)$$
$$({}^i\mathbf{A}_1{}^i\mathbf{A}_2 \ldots {}^i\mathbf{A}_n)({}^i\chi_1{}^i\chi_2 \ldots {}^i\chi_p)({}^i\mu_1{}^i\mu_2 \ldots {}^i\mu_q)$$
$$({}^iv_1{}^iv_2 \ldots {}^iv_s)({}^i\sigma_1{}^i\sigma_2 \ldots {}^i\sigma_t)$$

The time requirement for baseline test is estimated as follows:

$$f(t_2) = {}^2T^2\psi_{S-T}({}^2H_1{}^2H_2 \ldots {}^2H_k)({}^2\theta_1{}^2\theta_2 \ldots {}^2\theta_m)({}^2\mathbf{A}_1{}^2$$
$$\mathbf{A}_2 \ldots {}^2\mathbf{A}_n)({}^2\chi_1{}^2\chi_2 \ldots {}^2\chi_p)({}^2\mu_1{}^2\mu_2 \ldots {}^2\mu_q)$$
$$({}^2v_1{}^2v_2 \ldots {}^2v_s)({}^2\sigma_1{}^2\sigma_2 \ldots {}^2\sigma_t)({}^2b_1 \ldots {}^2b_r)$$

The time requirement for system test is estimated as follows:

$$f(t_4) = {}^4T^4\psi_{S\text{-}T}({}^4H_1{}^4H_2\ldots{}^4H_k)({}^4\theta_1{}^4\theta_2\ldots{}^4\theta_m)({}^4\text{Я}_1{}^4\text{Я}_2\ldots{}^4\text{Я}_n)({}^4\chi_1{}^4\chi_2\ldots{}^4\chi_p)({}^4\mu_1{}^4\mu_2\ldots{}^4\mu_q)({}^4v_1{}^4v_2\ldots{}^4v_s)({}^2\sigma_1{}^4\sigma_2\ldots{}^4\sigma_t)({}^4b_1\ldots{}^4b_r)$$

The time estimate for the migration process shown on the assessment template is estimated as follows:

$$\sum_{i=1}^{i} f(t_i)$$

In accordance with step 1613, desired tolerances are applied in the manner described with reference to FIG. 1. In accordance with step 1614, a Type A assessment is output, which shows estimated costs and/or time requirements for the migration process and each migration task in the assessment template, given the base variables, attributes and code metrics received. Any such estimates may be represented as fixed numbers or ranges. In the preferred embodiment of the invention, costs and/or time requirements estimated in a Type A assessment are output as ranges, which are accurate within thirty percent (30%). More preferably, the estimates are accurate within fifteen to twenty-five percent (15-25%).

The invention is also directed to computer-readable program products having computer-readable program code means for producing cost and time requirement estimates for migration projects, in accordance with the various embodiments of the method described herein. Selecting appropriate media and implementing the process described herein on such media are matters that will be readily known to those skilled in the art.

While the foregoing material describes and illustrates the current invention with reference to particular embodiments, these embodiments are intended as examples and not to define the entire scope of the current invention. Those skilled in the art will appreciate that many aspects of these embodiments may be changed and steps of the various methods re-arranged, such as creation of template, assignment of base costs and receiving additional data, without departing from the spirit or scope of the invention.

What is claimed is:

1. A method for estimating a cost and a duration for migrating a computer application from a source platform to a target platform, the method comprising:
   a computer receiving a request to estimate the cost and the duration for migrating the computer application, the request including an indication of a first, second or third assessment type; and
   the computer receiving specification of (a) a plurality of migration attributes of the computer application, the plurality of migration attributes being associated with the first assessment type, (b) a first subset of migration attributes that is less than all of the plurality of migration attributes, the first subset of migration attributes being associated with the second assessment type, the second assessment type being less accurate than the first assessment type, or (c) a second subset of migration attributes that is less than all of the first subset of migration attributes, the second subset of migration attributes being associated with the third assessment type, the third assessment type being less accurate than the second assessment type, the plurality of migration attributes including a source code corresponding to the computer application, the first subset of migration attributes including a count of a number of lines in the source code, and the second subset of migration attributes including a type of operating system on which the computer application executes;
   the computer receiving specification of a set of tasks required for the migration;
   the computer determining, an average cost of completing each of the task and an average duration for completing each of the task; and
   the computer estimating the cost and the duration for migrating the computer application based at least in part on the average cost of completing each task, the average duration for completing each task and one of the plurality of migration attributes, the first subset of migration attributes and the second subset of migration attributes.

2. The method of claim 1, wherein the assessment type is associated with a type of information to be migrated and an amount of information to be migrated, the set of tasks including at least one of a plurality of first tasks, a plurality of second tasks and a plurality of third tasks, wherein the first assessment type is associated with a list of first tasks including the plurality of first tasks, the second assessment type associated with a list of second tasks including the plurality of second tasks, and the third assessment type associated with a list of third tasks including the plurality of third tasks; and wherein the computer receiving the set of tasks includes the computer receiving tasks from the one list of first tasks, list of second tasks and list of third tasks associated with the assessment type.

3. The method of claim 2, wherein at least one task of the set of tasks is one of user-defined and pre-defined in one of the list of first tasks, the list of second tasks and the list of third tasks.

4. The method of claim 1, wherein the average duration includes at least one of a number of hours, a number of days, a start time and a finish time, the method further comprising:
   the computer creating an assessment template including each task in the set of tasks, the average cost of completing each task and the average duration for completing each task.

5. The method of claim 4, wherein the assessment template includes a breakdown of a cost of labor and a cost of materials; and wherein the plurality of migration attributes and the first subset of migration attributes include a source code attribute comprising at least one of a number of code modules, a number of files, call types, a number of calls, a data volume, a structural integrity, a use of lexical functions and operating system dependence; and when the assessment type is the first assessment type, the method further comprises:
   the computer determining source code metrics based at least in part on an analysis of the source code.

6. The method of claim 1, wherein the average cost and the average duration for each task is different depending on whether assessment type is one of the first assessment type, the second assessment type and the third assessment type.

7. The method of claim 1, wherein estimating the cost and the duration further comprises:
   the computer determining a cost factor by which at least one migration attribute of one of the plurality of migration attributes, the first subset of migration attributes and the second subset of migration attributes one of increases and decreases the average cost of completing at least one task of the set of tasks, the cost factor being different for each migration attribute;
   the computer determining a time factor by which the at least one migration attribute of one of the plurality of migration attributes, the first subset of migration attributes and the second subset of migration attributes one of increases and decreases the average duration of the at least one task in the set of tasks; and when the assessment type is the first assessment type, determining a custom factor by which the at least one migration attribute of one of the plurality of migration attributes, the first subset of migration attributes and the second subset of migration attributes one of increases and decreases the average cost and the average duration of the at least one task in the set of tasks.

8. The method of claim 7, wherein estimating the cost and the duration further comprises:

the computer estimating the cost of migrating the computer application by multiplying the cost factor and the average cost of completing each task in the set of tasks; and estimating the duration of migrating the computer application by multiplying the time factor and the average duration of each task in the set of tasks.

9. The method of claim 8, wherein the plurality of migration attributes, the first subset of migration attributes and the second subset of migration attributes include a hardware attribute, an operating system attribute, an application attribute, an environment attribute and a testing attribute, the method further comprising:

the computer applying the degree of accuracy to the cost and the duration for migrating the computer application.

10. A computer program product for estimating a cost and a duration for migrating a computer application from a source platform to a target platform, said computer program product comprising:

a non-transitory computer readable storage device and program instructions stored on the computer readable storage device, the program instructions comprising:

first program instructions to receive a request to estimate the cost and the duration for migrating the computer application, the request including an assessment type, the assessment type being one of a first assessment type, a second assessment type and a third assessment type;

second program instructions to receive specification of (a) a plurality of migration attributes of the computer application, the plurality of migration attributes being associated with the first assessment type, (b) a first subset of migration attributes that is less than all of the plurality of migration attributes, the first subset of migration attributes being associated with the second assessment type, the second assessment type being less accurate than the first assessment type, or (c) a second subset of migration attributes that is less than all of the first subset of migration attributes, the second subset of migration attributes being associated with the third assessment type, the third assessment type being less accurate than the second assessment type, the plurality of migration attributes including a source code corresponding to the computer application, the first subset of migration attributes including a count of a number of lines in the source code, and the second subset of migration attributes including a type of operating system on which the computer application executes third program instructions to receive a set of tasks required for migration;

fourth program instructions to determine an average cost of completing each of the tasks and an average duration for completing each of the tasks; and fifth program instructions to estimate the cost and the duration for migrating the computer application based at least in part on the average cost of completing each task, the average duration for completing each task and one of the plurality of migration attributes, the first subset of migration attributes and the second subset of migration attributes.

11. The computer program product of claim 10, wherein each assessment type is associated with a type of information to be migrated and an amount of information to be migrated, the set of tasks including at least one of a plurality of first tasks, a plurality of second tasks and a plurality of third tasks, wherein the first assessment type is associated with a list of first tasks including the plurality of first tasks, the second assessment type associated with a list of second tasks including the plurality of second tasks, and the third assessment type associated with a list of third tasks including the plurality of third tasks; and the third program instructions further include instructions to receiving tasks from the one list of first tasks, list of second tasks and list of third tasks associated with the assessment type.

12. The computer program product of claim 11, wherein at least one task of the set of tasks is one of user-defined and pre-defined in one of the list of first tasks, the list of second tasks and the list of third tasks.

13. The computer program product of claim 10, wherein the average duration includes at least one of a number of hours, a number of days, a start time and a finish time; and the fifth program instructions further include instructions to create an assessment template including each task in the set of tasks, the average cost of completing each task and the average duration for completing each task.

14. The computer program product of claim 13, wherein the assessment template includes a breakdown of a cost of labor and a cost of materials; and wherein the plurality of migration attributes and the first subset of migration attributes include a source code attribute comprising at least one of a number of code modules, a number of files, call types, a number of calls, a data volume, a structural integrity, a use of lexical functions and operating system dependence; and when the assessment type is the first assessment type, said second program instructions further include instructions to:

determine source code metrics based at least in part on an analysis of the source code.

15. The computer program product of claim 10, wherein the average cost and the average duration for each task is different depending on whether assessment type is one of the first assessment type, the second assessment type and the third assessment type.

16. The computer program product of claim 10, wherein said fifth program instructions further include instructions to:

determine a cost factor by which at least one migration attribute of one of the plurality of migration attributes, the first subset of migration attributes and the second subset of migration attributes one of increases and decreases the average cost of completing at least one task of the set of tasks, the cost factor being different for each of the migration attributes;

determine a time factor by which the at least one migration attribute of one of the plurality of migration attributes, the first subset of migration attributes and the second subset of migration attributes one of increases and decreases the average duration of the at least one task in the set of tasks; and when the assessment type is the first assessment type, determine a custom factor by which the at least one migration attribute of one of the plurality of migration attributes, the first subset of migration attributes and the second subset of migration attributes one of increases and decreases the average cost and the average duration of the at least one task in the set of tasks.

17. The computer program product of claim 16, wherein said fifth program instructions further include instructions to:
estimate the cost of migrating the computer application by multiplying the cost factor and the average cost of completing each task in the set of tasks; and
estimating the duration of migrating the computer application by multiplying the time factor and the average duration of each task in the set of tasks.

18. The computer program product of claim 17, wherein the plurality of migration attributes, the first subset of migration attributes and the second subset of migration attributes include a hardware attribute, an operating system attribute, an application attribute, an environment attribute and a testing attribute, and said fifth program instructions further include instructions to:
apply the degree of accuracy to the cost and the duration for migrating the computer application.

* * * * *